(12) United States Patent
Abedini et al.

(10) Patent No.: US 11,071,074 B2
(45) Date of Patent: Jul. 20, 2021

(54) TECHNIQUES AND APPARATUSES FOR CONFIGURING RESOURCES FOR SYNCHRONIZATION IN A WIRELESS BACKHAUL NETWORK

(71) Applicant: QUALCOMM Incorporated, San Diego, CA (US)

(72) Inventors: Navid Abedini, Raritan, NJ (US); Muhammad Nazmul Islam, Edison, NJ (US); Sundar Subramanian, San Diego, CA (US); Karl Georg Hampel, Hoboken, NJ (US); Juergen Cezanne, Ocean Township, NJ (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 118 days.

(21) Appl. No.: 15/945,660

(22) Filed: Apr. 4, 2018

(65) Prior Publication Data
US 2018/0359715 A1 Dec. 13, 2018

Related U.S. Application Data

(60) Provisional application No. 62/517,023, filed on Jun. 8, 2017.

(51) Int. Cl.
*H04J 3/06* (2006.01)
*H04W 56/00* (2009.01)
(Continued)

(52) U.S. Cl.
CPC ......... *H04W 56/001* (2013.01); *H04L 5/0048* (2013.01); *H04W 56/0005* (2013.01); *H04L 5/0053* (2013.01); *H04W 84/00* (2013.01)

(58) Field of Classification Search
CPC ............... H04L 5/0048; H04L 5/0053; H04W 56/0005; H04W 56/001; H04W 84/00
See application file for complete search history.

(56) References Cited

U.S. PATENT DOCUMENTS

| 8,743,843 B2 | 6/2014 | Laroia et al. |
| 8,755,362 B2 | 6/2014 | Laroia et al. |

(Continued)

FOREIGN PATENT DOCUMENTS

| EP | 0650304 B1 | 12/2002 |
| WO | WO-2007082278 A1 | 7/2007 |

(Continued)

OTHER PUBLICATIONS

AT&T: "NR Initial Access Procedure Design", 3GPP Draft; R1-1612361 NR-Initial Access,3rd Generation Partnership Project (3GPP), Mobile Competence Centre, 650, Route Des Lucioles, F-06921, Sophia-Anti Polis Cedex, France, vol. RAN WG1, No. Reno, USA; Nov. 14, 2016-Nov. 18, 2016 Nov. 13, 2016, XP051176309, Retrieved from the Internet: URL:http://www.3gpp.org/ftp/Meetings_3GPP_SYNC/RAN1/Docs/ [retrieved on Nov. 13, 2016], 6 pages.

(Continued)

*Primary Examiner* — Abdelillah Elmejjarmi
(74) *Attorney, Agent, or Firm* — Qualcomm Incorporated

(57) ABSTRACT

Certain aspects of the present disclosure generally relate to wireless communication. A wireless node may determine a pattern for transmitting multiple synchronization communications in one or more synchronization communication sets. The wireless node may determine a set of resources, in the one or more synchronization communication sets, to be used to transmit the multiple synchronization communications based at least in part on the pattern. The wireless node may transmit the multiple synchronization communications using the set of resources. A first synchronization communication, of the multiple synchronization communications, may be (Continued)

frequency division multiplexed with a second synchronization communication. Numerous other aspects are provided.

30 Claims, 13 Drawing Sheets

(51) Int. Cl.
*H04L 5/00* (2006.01)
*H04W 84/00* (2009.01)

(56) References Cited

U.S. PATENT DOCUMENTS

| | | | |
|---|---|---|---|
| 8,879,519 | B2 | 11/2014 | Laroia et al. |
| 2013/0142288 | A1* | 6/2013 | Dinan ............... H04L 27/2649 375/340 |
| 2016/0337839 | A1* | 11/2016 | Chae ................. H04W 72/1242 |
| 2018/0220360 | A1* | 8/2018 | Sheng .................. H04J 11/0076 |
| 2019/0327123 | A1* | 10/2019 | Wang ..................... H04L 27/26 |

FOREIGN PATENT DOCUMENTS

| | | | |
|---|---|---|---|
| WO | WO-2007082281 | A1 | 7/2007 |
| WO | WO-2012171909 | A1 | 12/2012 |
| WO | WO2016064315 | A1 * | 1/2016 ............... H04L 5/00 |

OTHER PUBLICATIONS

Huawei et al., "Discussion and Evaluation on NR-SS Multiplexing and Bandwidth", 3GPP Draft; R1-1700033, 3rd Generation Partnership Project (3GPP), Mobile Competence Centre, 650, Route Des Lucioles, F-06921, Sophia-Anti Polis Cedex, France, vol. RAN WG1, No. Spokane, USA; Jan. 16, 2017-Jan. 20, 2017 Jan. 16, 2017, XP051207575, Retrieved from the Internet: URL:http://www.3gpp.org/ftp/Meetings_3GPP_SYNC/RAN1/Docs/ [retrieved on Jan. 16, 2017], 12 pages.
Huawei et al., "Discussion on SS Burst Set Composition and Ss Block Time Index Indication", 3GPP Draft; R1-1703353, 3rd Generation Partnership Project (3GPP), Mobile Competence Centre; 650, Route Des Lucioles; F-06921 Sophia-Antipolis Cedex; France vol. RAN WG1, No. Athens, Greece; Feb. 13, 2017-Feb. 17, 2017 Feb. 12, 2017 (Feb. 12, 2017), XP051210483, pp. 1-7, Retrieved from the Internet: URL:http://www.3gpp.org/ftp/Meetings_3GPP SYNC/RAN1/Docs/ [retrieved on Feb. 12, 2017].
International Search Report and Written Opinion—PCT/US2018/026255—ISA/EPO—Jul. 19, 2018.
Qualcomm Inc: "Multi-beam Sync Design", 3GPP TSG RAN WG1 Meeting #87, R1-1612024, 3rd Generation Partnership Project (3GPP), Mobile Competence Centre; 650, Route Des Lucioles; F-06921 Sophia-Anti Polis Cedex; France, vol. RAN WG1, No. Reno, Nevada, USA, Nov. 14-18, 2016, pp. 1-10, XP051175986, Retrieved from the Internet: URL:http://www.3gpp.org/ftp/Meetings_3GPP_SYNC/RAN1/Docs/ [retrieved on Nov. 13, 2016].

* cited by examiner

TECHNIQUES AND APPARATUSES FOR CONFIGURING RESOURCES FOR SYNCHRONIZATION IN A WIRELESS BACKHAUL NETWORK

CROSS-REFERENCE TO RELATED APPLICATIONS UNDER 35 U.S.C. § 119

This application claims priority to U.S. Provisional Patent Application No. 62/517,023, filed Jun. 8, 2017, entitled "TECHNIQUES AND APPARATUSES FOR CONFIGURING RESOURCES FOR SYNCHRONIZATION IN A WIRELESS BACKHAUL NETWORK," which is hereby expressly incorporated by reference herein.

INTRODUCTION

Aspects of the present disclosure generally relate to wireless communication, and more particularly to techniques and apparatuses for configuring resources for synchronization in a wireless backhaul network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include determining, by a wireless node, a pattern for transmitting multiple synchronization communications in one or more synchronization communication sets; determining, by the wireless node, a set of resources, in the one or more synchronization communication sets, to be used to transmit the multiple synchronization communications based at least in part on the pattern; and transmitting, by the wireless node, the multiple synchronization communications using the set of resources, wherein a first synchronization communication of the multiple synchronization communications is frequency division multiplexed with a second synchronization communication.

In some aspects, a wireless node for wireless communication may include a memory and one or more processors operatively coupled to the memory. The one or more processors may be configured to determine a pattern for transmitting multiple synchronization communications in one or more synchronization communication sets; determine a set of resources, in the one or more synchronization communication sets, to be used to transmit the multiple synchronization communications based at least in part on the pattern; and transmit the multiple synchronization communications using the set of resources, wherein a first synchronization communication of the multiple synchronization communications is frequency division multiplexed with a second synchronization communication.

In some aspects, an apparatus for wireless communication may include means for determining a pattern for transmitting multiple synchronization communications in one or more synchronization communication sets; means for determining a set of resources, in the one or more synchronization communication sets, to be used to transmit the multiple synchronization communications based at least in part on the pattern; and means for transmitting the multiple synchronization communications using the set of resources, wherein a first synchronization communication of the multiple synchronization communications is frequency division multiplexed with a second synchronization communication.

In some aspects, a non-transitory computer-readable medium may include one or more instructions for wireless communication. The one or more instructions, when executed by one or more processors, may cause the one or more processors to determine a pattern for transmitting multiple synchronization communications in one or more synchronization communication sets; determine a set of resources, in the one or more synchronization communication sets, to be used to transmit the multiple synchronization communications based at least in part on the pattern; and transmit the multiple synchronization communications using the set of resources, wherein a first synchronization communication of the multiple synchronization communications is frequency division multiplexed with a second synchronization communication.

In some aspects, a method of wireless communication may include receiving, by a wireless node, an indication of a pattern associated with determining a set of resources, in one or more synchronization communication sets, to be used to receive one or more synchronization communications; determining, by the wireless node, the set of resources based at least in part on the indication of the pattern; and receiving, by the wireless node, the one or more synchronization communications using the set of resources, wherein a first synchronization communication of the one or more synchronization communications is frequency division multiplexed with a second synchronization communication.

In some aspects, a wireless node for wireless communication may include a memory and one or more processors operatively coupled to the memory. The one or more processors may be configured to receive an indication of a pattern associated with determining a set of resources, in one or more synchronization communication sets, to be used to receive one or more synchronization communications; determine the set of resources based at least in part on the indication of the pattern; and receive the one or more synchronization communications using the set of resources, wherein a first synchronization communication of the one or more synchronization communications is frequency division multiplexed with a second synchronization communication.

In some aspects, an apparatus for wireless communication may include means for receiving an indication of a pattern associated with determining a set of resources, in one or more synchronization communication sets, to be used to receive one or more synchronization communications; means for determining the set of resources based at least in part on the indication of the pattern; and means for receiving the one or more synchronization communications using the set of resources, wherein a first synchronization communication of the one or more synchronization communications is frequency division multiplexed with a second synchronization communication.

In some aspects, a non-transitory computer-readable medium may include one or more instructions for wireless communication. The one or more instructions, when executed by one or more processors, may cause the one or more processors to receive an indication of a pattern associated with determining a set of resources, in one or more synchronization communication sets, to be used to receive one or more synchronization communications; determine the set of resources based at least in part on the indication of the pattern; and receive the one or more synchronization communications using the set of resources, wherein a first synchronization communication of the one or more synchronization communications is frequency division multiplexed with a second synchronization communication.

Aspects generally include a method, a wireless node, an apparatus, a non-transitory computer-readable medium, a computer program product, a user equipment, and a base station as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
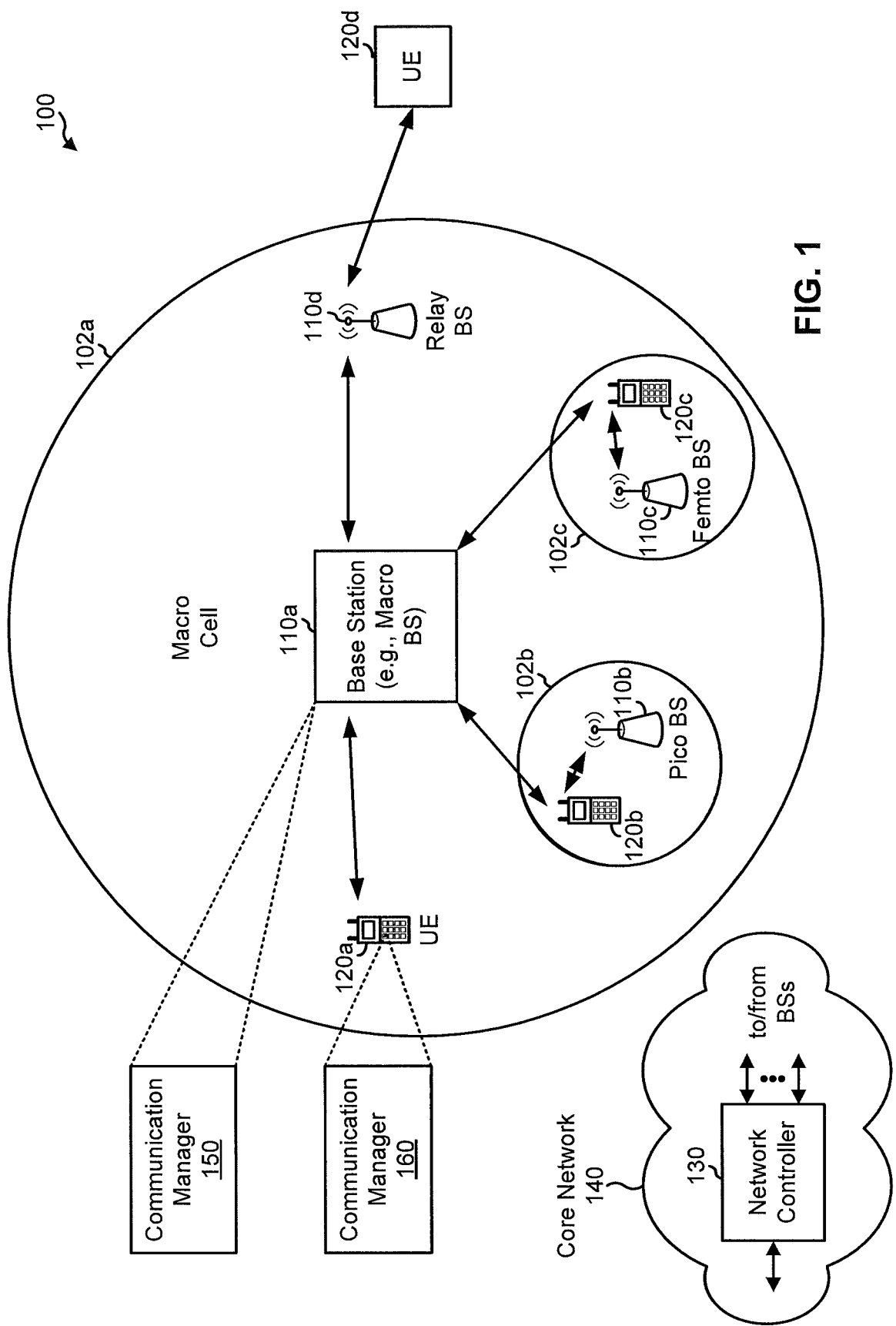
FIG. 1 is a block diagram conceptually illustrating an example of a wireless communication network, in accordance with various aspects of the present disclosure.

A wireless backhaul network may be deployed to provide connectivity to a core network. In a wireless backhaul network, an anchor base station may communicate with the core network via a wired connection (e.g., a fiber connection), and non-anchor base stations may communicate with the anchor base station via wireless links In some cases, a chain of non-anchor base stations may communicate via wireless links along the chain to form a path to the anchor base station and the core network. Additionally, or alternatively, a single base station may communicate wirelessly with multiple other base stations, forming a mesh network.

A wireless backhaul network may permit simple and cheap deployment of additional base stations because the base stations may be able to detect one another automatically and be deployed without expensive infrastructure, such as wired connections. Furthermore, network resources (e.g., frequency resources, time resources, and/or the like) may be shared between wireless access links (e.g., between a base station and a UE or between UEs) and wireless backhaul links (e.g., between base stations), thereby enhancing wireless link capacity and reducing network latency. In some cases, the base stations and/or UEs may utilize millimeter waves and/or directional communications (e.g., beamforming, precoding, and/or the like) for the wireless links to reduce inter-link interference.

To support automatic deployment of new base stations, a deployed base station may periodically transmit synchronization communications, such as one or more synchronization signals (e.g., a primary synchronization signal (PSS), a secondary synchronization signal (SSS), and/or the like) and/or one or more synchronization channels (e.g., a physical broadcast channel (PBCH) via which a demodulation reference signal (DMRS) and/or other synchronization signals may be transmitted, a physical channel carrying remaining minimum system information (RMSI), a physical channel carrying other system information (OSI), and/or the like). A new base station may detect a synchronization communication from a deployed base station, and may use the synchronization communication to determine time synchronization, frequency synchronization, and/or other system information for establishing a wireless connection with the deployed base station (e.g., using an access procedure, such as a random access procedure). In this way, the new base station may be able to automatically connect to a deployed base station, thereby simplifying deployment of new base stations.

In a traditional (e.g., 3G, 4G, LTE, etc.) radio access network, where base stations communicate with one another via wired connections and communicate with UEs via wireless connections, a base station need only be capable of wireless transmission of synchronization communications (e.g., to UEs), and need not be capable of wireless reception of synchronization communications (e.g., from other base stations). In a wireless backhaul network, a base station should be capable of wireless transmission of synchronization communications to other base stations and wireless reception of synchronization communications from other base stations so that a network of base stations may be created and synchronized via wireless communication. However, a base station cannot transmit and receive communications at the same time using half-duplex operations. As a result, when a base station is transmitting a synchronization communication during a time interval, the base station may not be capable of receiving a synchronization communication from another base station during the same time interval.

Techniques described herein increase the likelihood that a base station receives synchronization communications from neighbor base stations, thereby assisting in the formation and synchronization of more robust and reliable wireless backhaul networks. For example, techniques described herein may utilize frequency hopping and/or time hopping in association with transmission of synchronization communications to increase a likelihood of reception of the synchronization communications. Furthermore, techniques described herein may utilize frequency division multiplexing to support multiple synchronization communications (e.g., a large number of synchronization communications), thereby increasing the number of synchronization communications that can be transmitted in a time interval. This may lead to more efficient resource utilization and faster detection of neighbor base stations than if synchronization communications were not frequency division multiplexed. Additional details are described elsewhere herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Using the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an LTE network. Wireless network 100 may include a number of base stations (BSs) 110 (shown as BS 110a, BS 110b, BS 110c, and BS 110d) and other network entities. A BS is an entity that communicates with user equipment (UEs) and/or other BSs, and may also be referred to as a Node B, an eNB, a gNB, a NR BS, a 5G NB, an access point, a transmit receive point (TRP), an access node (AN), and/or the like. Each BS may provide communication coverage for a particular geographic area. In 3GPP, the term "cell" can refer to a coverage area of a BS and/or a BS subsystem serving this coverage area, depending on the context in which the term is used. As used herein, the term "wireless node" may refer to a base station and/or a user equipment.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, a wireless link (e.g., a wireless backhaul link), and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may be implemented in a core network 140.

Core network 140 may include one or more devices to communicate with and/or control BSs 110 and/or one or more devices to route packets through core network 140 to one or more other networks. For example, core network 140 may include a mobility management entity (MME), a serving gateway (SGW), a packet data network (PDN) gateway (PGW), a home subscriber server (HSS), a policy charging and rules function (PCRF) device, an authentication, authorization, and accounting (AAA) server, and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) UEs and/or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. MTC UEs, as well as other types of UEs, may be implemented as narrowband internet of things (NB-IoT) devices. UE 120 may be included inside a housing that houses components of UE 120, such as processor components, memory components, and/or the like. As used herein, the term "wireless node" may refer to a BS 110 and/or a UE 120.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As shown in FIG. 1, base station 110 may include a communication manager 150. As described in more detail elsewhere herein, communication manager 150 may determine a pattern for transmitting multiple synchronization communications in one or more synchronization communication sets, may determine a set of resources in the one or more synchronization communication sets to be used to transmit the multiple synchronization communications based at least in part on the pattern, and may transmit the multiple synchronization communications using the set of resources, wherein a first synchronization communication of the multiple synchronization communications is frequency division multiplexed with a second synchronization communication.

Additionally, or alternatively, communication manager 150 may receive an indication of a pattern associated with determining a set of resources in one or more synchronization communication sets to be used to receive one or more synchronization communications, may determine the set of resources based at least in part on the indication of the pattern, and may receive the one or more synchronization communications using the set of resources, wherein a first synchronization communication of the one or more synchronization communications is frequency division multiplexed with a second synchronization communication. Additionally, or alternatively, communication manager 150 may perform one or more other operations described herein. Communication manager 150 may include one or more components of FIG. 2, as described below.

Similarly, UE 120 may include a communication manager 160. As described in more detail elsewhere herein, communication manager 160 may determine a pattern for transmitting multiple synchronization communications in one or more synchronization communication sets, may determine a set of resources in the one or more synchronization communication sets to be used to transmit the multiple synchronization communications based at least in part on the pattern, and may transmit the multiple synchronization communications using the set of resources, wherein a first synchronization communication of the multiple synchronization communications is frequency division multiplexed with a second synchronization communication.

Additionally, or alternatively, communication manager 160 may receive an indication of a pattern associated with determining a set of resources in one or more synchronization communication sets to be used to receive one or more synchronization communications, may determine the set of resources based at least in part on the indication of the pattern, and may receive the one or more synchronization communications using the set of resources, wherein a first synchronization communication of the one or more synchronization communications is frequency division multiplexed with a second synchronization communication. Additionally, or alternatively, communication manager 160 may perform one or more other operations described herein. Communication manager 160 may include one or more components of FIG. 2, as described below.

As indicated above, FIG. 1 is provided as an example. Other examples are possible and may differ from what was described with regard to FIG. 1.

Figure 2:
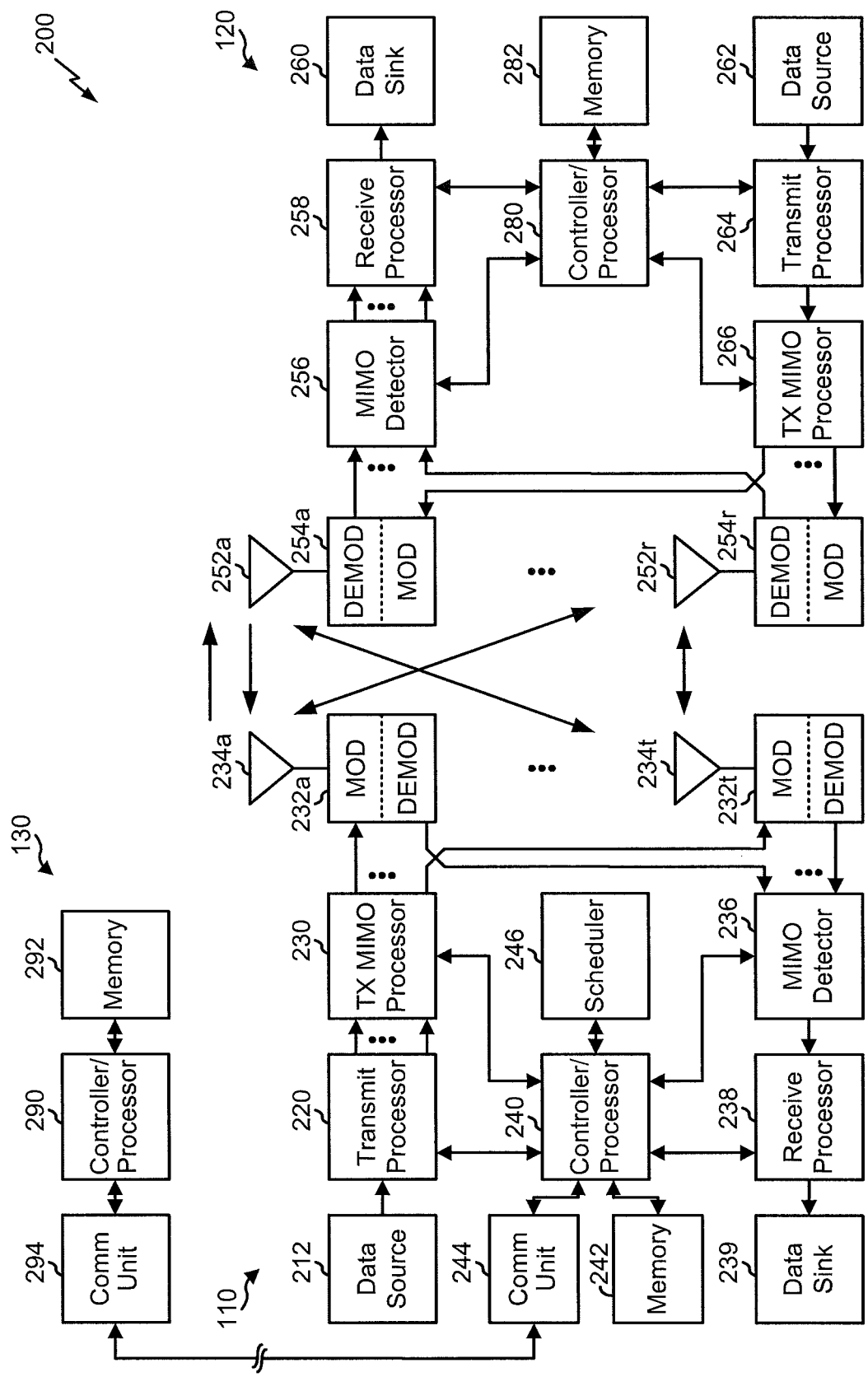
FIG. 2 shows a block diagram conceptually illustrating an example of a base station in communication with a user equipment (UE) in a wireless communication network, in accordance with various aspects of the present disclosure.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., DMRS, CRS, and/or the like) and synchronization signals (e.g., a PSS, an SSS, and/or the like).

A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MEMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. Memories 242 and 282 may store data and program codes for base station 110 and UE 120, respectively. A scheduler 246 may schedule UEs for data transmission on the downlink and/or uplink.

In some aspects, one or more components of UE 120 may be included in a housing. Controllers/processors 240 and 280 and/or any other component(s) in FIG. 2 may direct the operation at base station 110 and UE 120, respectively, to perform operations associated with configuring resources for synchronization, as described in more detail elsewhere herein. For example, controller/processor 240 and/or other processors and modules at base station 110 and/or UE 120 may perform or direct operations of base station 110 and/or UE 120 to perform one or more blocks of process 1000 of FIG. 10, process 1100 of FIG. 11, and/or other processes described herein. In some aspects, one or more of the components shown in FIG. 2 may be employed to perform example process 1000, example process 1100, and/or other processes for the techniques described herein.

In some aspects, base station 110 and/or UE 120 may include means for determining a pattern for transmitting multiple synchronization communications in one or more synchronization communication sets, means for determining a set of resources in the one or more synchronization communication sets to be used to transmit the multiple synchronization communications based at least in part on the pattern, and/or means for transmitting the multiple synchronization communications using the set of resources. Additionally, or alternatively, base station 110 and/or UE 120 may include means for receiving an indication of a pattern associated with determining a set of resources in one or more synchronization communication sets to be used to receive one or more synchronization communications, means for determining the set of resources based at least in part on the indication of the pattern, and/or means for receiving the one or more synchronization communications using the set of resources. Additionally, or alternatively, base station 110 and/or UE 120 may include means for performing other operations described herein. Such means may include one or more components shown in FIG. 2. Additionally, or alternatively, communication manager 150 and/or communication manager 160 may include one or more components shown in FIG. 2.

As indicated above, FIG. 2 is provided as an example. Other examples are possible and may differ from what was described with regard to FIG. 2.

Figure 3A:
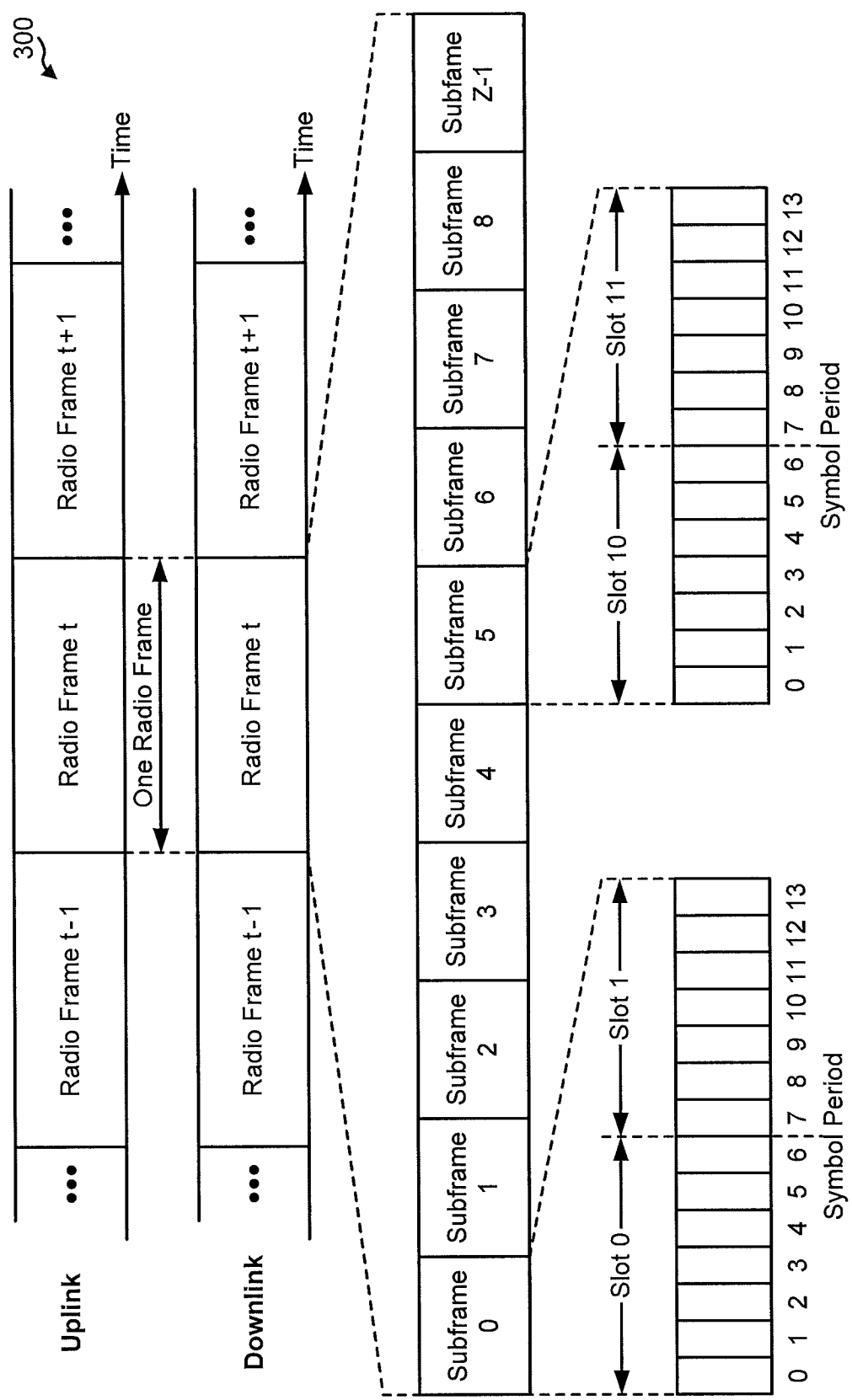
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a BS may transmit synchronization signals (e.g., a primary synchronization signal (PSS), a secondary synchronization signal (SSS), and/or the like) on the downlink for each cell supported by the BS. The PSS and SSS may be used by UEs for cell search and acquisition, and/or may be used by other BSs for automatic deployment in a wireless backhaul network. For example, the PSS may be used by UEs and/or BSs to determine symbol timing, and the SSS may be used by UEs and/or BSs to determine a physical cell identifier, associated with the BS, and frame timing. The BS may also transmit a physical broadcast channel (PBCH) and/or one or more other physical channels that transmit system information, such as system information that supports initial access by UEs and/or BSs, remaining minimum system information (RMSI), other system information (OSI), and/or the like.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
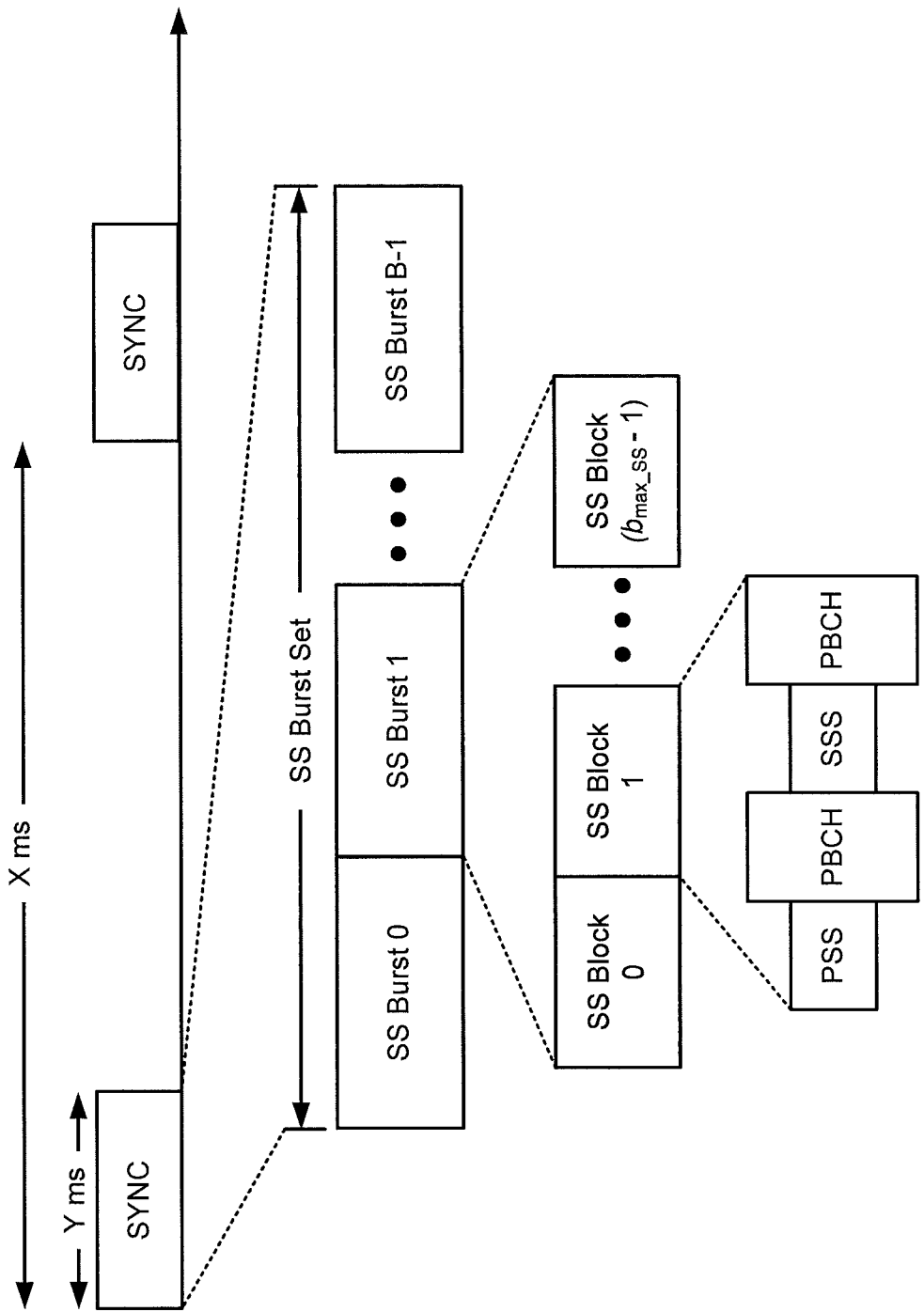
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst. In some aspects, different SS blocks may be beam-formed differently. An SS burst set may be periodically transmitted by a wireless node according to a synchronization period, such as every X milliseconds, as shown in FIG. 3B. Additionally, or alternatively, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein. Furthermore, the SS burst shown in FIG. 3B is an example of a synchronization communication block set, and other synchronization communications may be used in connection with the techniques described herein In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a BS-SS may include different information than a UE-SS. For example, one or more BS-SSs may exclude PBCH communications. Additionally, or alternatively, a BS-SS and a UE-SS may differ with respect to one or more of a time resource used for transmission or reception of the SS, a frequency resource used for transmission or reception of the SS, a periodicity of the SS, a waveform of the SS, a beamforming parameter used for transmission or reception of the SS, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst. In some aspects, the SS burst set may have a burst set periodicity, whereby the SS bursts of the SS burst set are transmitted by the BS according to the fixed burst set periodicity. In other words, the SS bursts may be repeated during each SS burst set.

The BS may transmit system information, such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
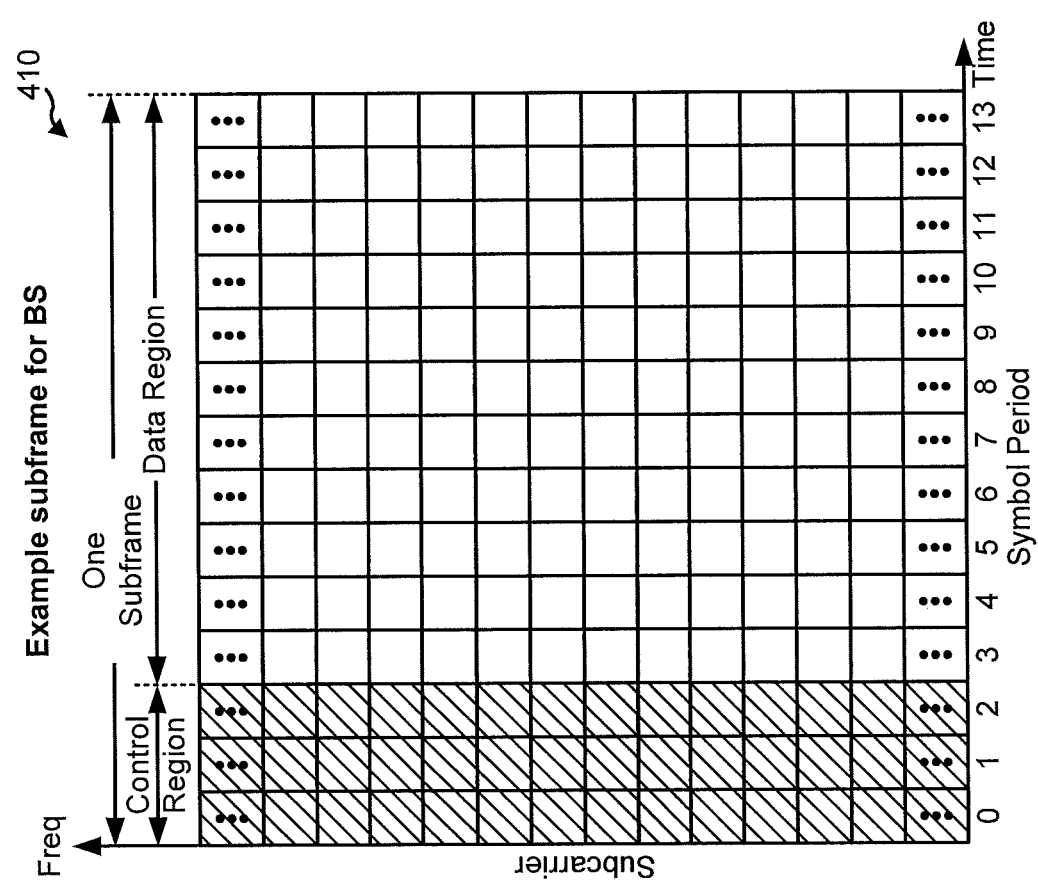
FIG. 4 is a block diagram conceptually illustrating an example subframe formats with a normal cyclic prefix, in accordance with various aspects of the present disclosure.

FIG. 4 shows an example subframe format 410 with a normal cyclic prefix. The available time frequency resources may be partitioned into resource blocks. Each resource block may cover 12 subcarriers in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 ms duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
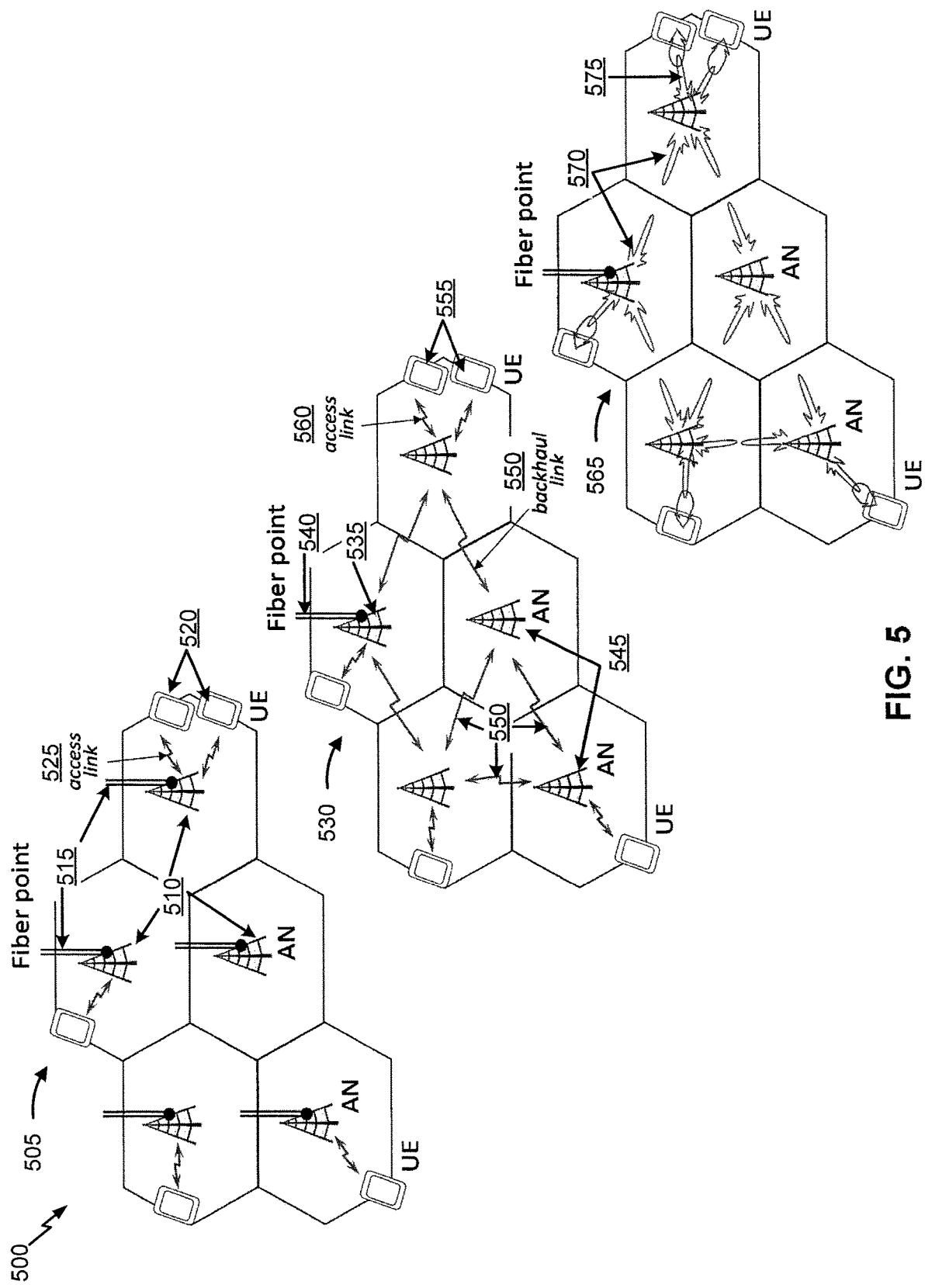
FIG. 5 is a diagram illustrating examples of radio access networks, in accordance with various aspects of the present disclosure.

FIG. 5 is a diagram illustrating examples 500 of radio access networks, in accordance with various aspects of the disclosure.

As shown by reference number 505, a traditional (e.g., 3G, 4G, LTE, etc.) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may correspond to a base station 110 shown in FIG. 1. Similarly, a UE 520 shown in FIG. 5 may correspond to a UE 120 shown in FIG. 1.

As shown by reference number 530, a radio access network may include a wireless backhaul network, where at least one base station is an anchor base station 535 that communicates with a core network via a wired backhaul link 540, such as a fiber connection. The wireless backhaul network may include one or more non-anchor base stations 545 that communicate directly with or indirectly with (e.g., via one or more non-anchor base stations 545) the anchor base station 535 via one or more backhaul links 550 to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may correspond to a base station 110 shown in FIG. 1. Similarly, a UE 555 shown in FIG. 5 may correspond to a UE 120 shown in FIG. 1.

As shown by reference number 565, in some aspects, a radio access network that includes a wireless backhaul network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 570 between base stations may use millimeter waves to carry information and/or may be directed toward a target base station using beamforming, precoding, and/or the like. Similarly, the wireless access links 575 between a UE and a base station may use millimeter waves and/or may be directed toward a target wireless node (e.g., a UE and/or a base station). In this way, inter-link interference may be reduced.

The configuration of base stations and UEs in FIG. 5 is shown as an example, and other examples are possible. For example, one or more base stations illustrated in FIG. 5 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 5 is provided as an example. Other examples are possible and may differ from what was described with regard to FIG. 5.

Figure 6:
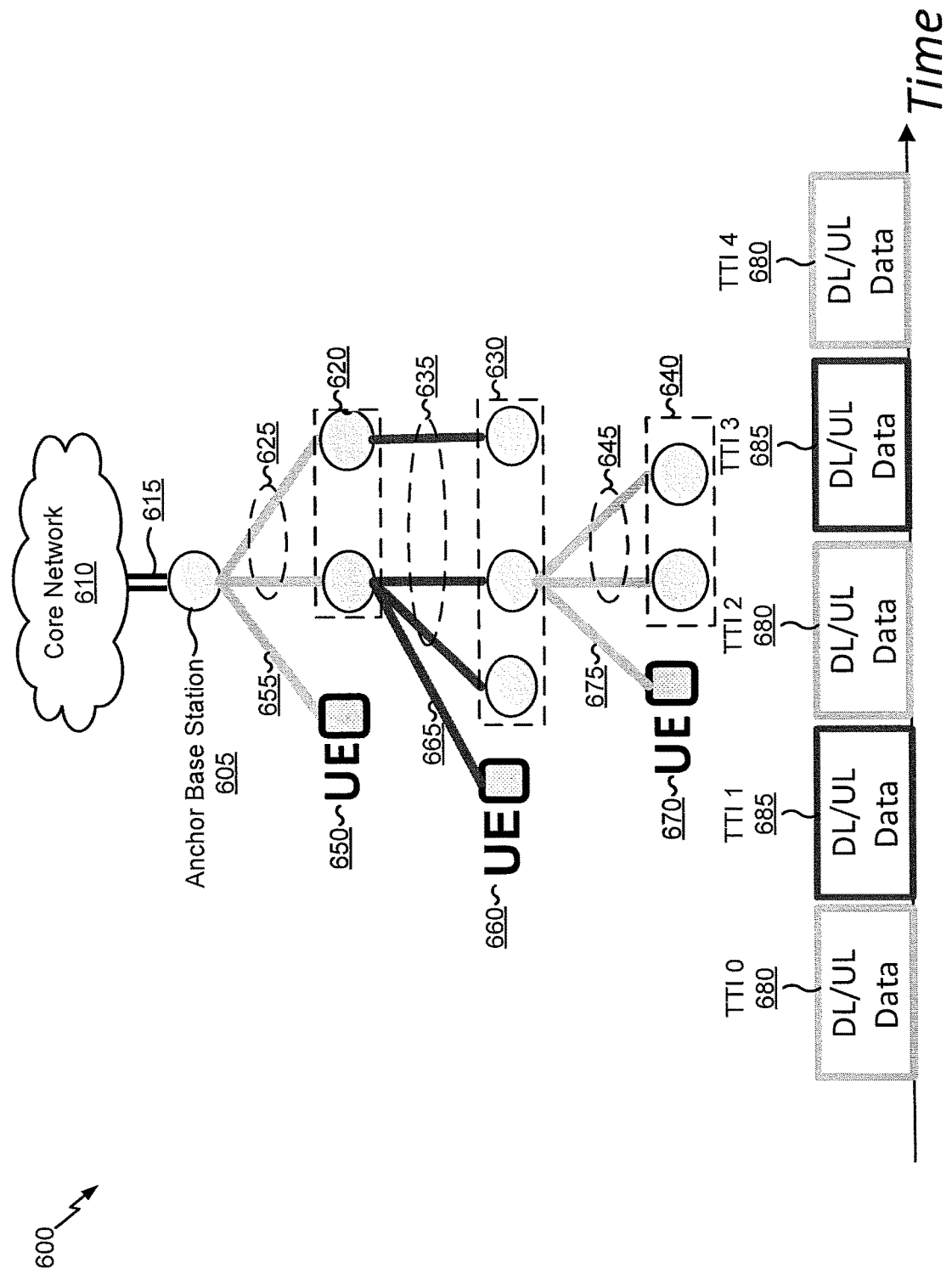
FIG. 6 is a diagram illustrating an example of resource partitioning in a wireless backhaul network, in accordance with various aspects of the present disclosure.

FIG. 6 is a diagram illustrating an example 600 of resource partitioning in a wireless backhaul network, in accordance with various aspects of the disclosure.

As shown in FIG. 6, an anchor base station 605 may be connected to a core network 610 via a wired backhaul link 615, such as a fiber connection. As further shown, non-anchor base stations 620 may communicate directly with anchor base station 605 via wireless backhaul links 625. In some aspects, one or more non-anchor base stations may communicate indirectly with anchor base station 605 via multiple wireless backhaul links (e.g., via one or more other non-anchor base stations). For example, and as shown, a first set of non-anchor base stations 630 may communicate indirectly with anchor base station 605 via a wireless backhaul link 635 and a wireless backhaul link 625. As further shown, a second set of non-anchor base stations 640 may communicate indirectly with anchor base station 605 via a wireless backhaul link 645, a wireless backhaul link 635, and a wireless backhaul link 625.

As further shown, a UE 650 may communicate with anchor base station 605 via a wireless access link 655, a UE 660 may communicate with a non-anchor base station 620 via a wireless access link 665, and a UE 670 may communicate with a non-anchor base station 630 via a wireless access link 675.

In some aspects, an index (e.g., a color index) may be assigned to a wireless link and/or a wireless node (e.g., a base station or a UE). The index may indicate one or more resources allocated to a wireless node for communication via the wireless link. For example, and as shown, a first index 680 may be associated with transmission time intervals (TTIs) 0, 2, and 4, and a second index 685 may be associated with TTIs 1 and 3. As indicated by light gray lines in FIG. 6, the first index 680 may be assigned to wireless backhaul links 625 and 645 and wireless access links 655 and 675. Thus, information may be transmitted over these links during TTIs 0, 2, and 4, and not during TTIs 1 and 3. Similarly, and as indicated by dark gray lines in FIG. 6, the second index 685 may be assigned to wireless backhaul links 635 and wireless access links 665 Thus, information may be transmitted over these links during TTIs 1 and 3, and not during TTIs 0, 2, and 4. In this way, wireless nodes may coordinate communication such that a wireless node is not configured to transmit and receive data at the same time.

While the resources are shown as time resources, additionally, or alternatively, an index may be associated with a frequency resource. Furthermore, the configuration of base stations and UEs in FIG. 6 is shown as an example, and other examples are possible. For example, the base stations illustrated in FIG. 6 may be replaced by UEs that communicate via a UE-to-UE access network (e.g., a peer-to-peer network, a device-to-device network, and/or the like). In this case, an anchor node may refer to a UE that is directly in communication with a base station (e.g., a base station that provides access to a core network).

As indicated above, FIG. 6 is provided as an example. Other examples are possible and may differ from what was described with regard to FIG. 6.

Figure 7:
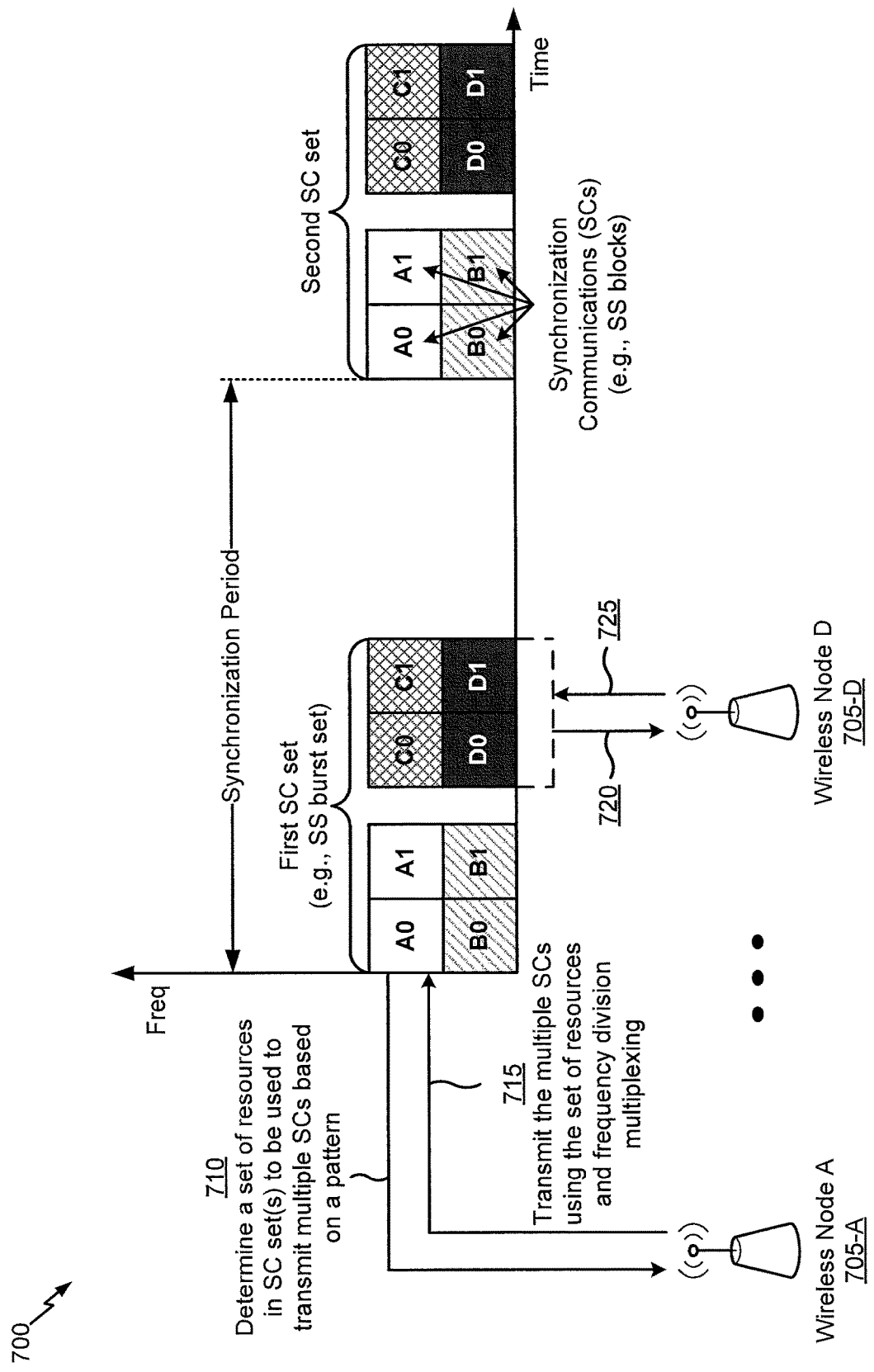
FIGS. 7-9 are diagrams illustrating examples of configuring resources for synchronization in a wireless backhaul network, in accordance with various aspects of the present disclosure.

FIG. 7 is a diagram illustrating an example 700 of configuring resources for synchronization in a wireless backhaul network, in accordance with various aspects of the present disclosure.

As shown in FIG. 7, one or more wireless nodes, shown as wireless node 705-A through wireless node 705-D (collectively referred to as wireless nodes 705), may determine a set of resources for transmission of multiple synchronization communications in one or more synchronization communication sets. In some aspects, one or more wireless nodes 705 may communicate using millimeter waves. In some aspects, one or more wireless nodes 705 may be base stations acting as access points to a core network, such as one or more of the base stations described elsewhere herein in connection with FIGS. 1, 2, 5, and/or 6. Additionally, or alternatively, one or more wireless nodes 705 may be UEs acting as access points to a core network (e.g., via a UE-to-UE network, a device-to-device network, a peer-to-peer network, and/or the like), such as one or more of the UEs described elsewhere herein in connection with FIGS. 1, 2, 5, and/or 6.

As shown by reference number 710, wireless node 705-A may determine a set of resources, in one or more synchronization communication sets, to be used to transmit multiple synchronization communications based at least in part on a pattern. For example, wireless node 705-A may determine a pattern for transmitting multiple synchronization communications in one or more synchronization communication sets. In some aspects, the pattern may be signaled to wireless node 705-A, such as by another wireless node 705, by an upper layer device in the core network, and/or the like. Wireless node 705-A may determine a set of resources, in the one or more synchronization communication sets, to be used to transmit the multiple synchronization communications based at least in part on the pattern.

In some aspects, the set of resources may include one or more time resources. Additionally, or alternatively, the set of resources may include one or more frequency resources. Additionally, or alternatively, the set of resources may include one or more beamforming parameters. For example, in some aspects, at least one of the multiple synchronization communications is beamformed. In some aspects, more than one of the multiple synchronization communications are beamformed. In some aspects, different synchronization communications of the multiple synchronization communications are transmitted using different transmission beams (e.g., different beamforming parameters). In this way, a wireless node 705 may direct synchronization communications to target devices (e.g., base stations and/or UEs), thereby reducing interference.

As shown by reference number 715, wireless node 705-A may transmit the multiple synchronization communications using the set of resources. In some aspects, a first synchronization communication, of the multiple synchronization communications, is frequency division multiplexed with a second synchronization communication. Additionally, or alternatively, the multiple synchronization communications, transmitted by wireless node 705-A, include a third synchronization communication. In some aspects, the second synchronization communication is transmitted by wireless node 705-A (e.g., is included in the multiple synchronization communications transmitted by the wireless node 705-A, and/or is the same as the third synchronization communication). In some aspects, the second synchronization communication is transmitted by another wireless node 705 (e.g., is not included in the multiple synchronization communications transmitted by the wireless node 705-A, and/or is different from the third synchronization communication).

For example, and as shown, the wireless node 705-A may transmit two synchronization communications in a first synchronization communication (SC) set, shown as SC A0 and SC A1. In some aspects, SC A0 may be transmitted using a first transmission beam (e.g., in a first direction), and SC A1 may be transmitted using a second transmission beam (e.g., in a second direction). In some aspects, SC A0 and SC A1 may be the same SC transmitted using different transmission beams. In some aspects, SC A0 and SC A1 may be different SCs.

As further shown, SC A0 may be frequency division multiplexed with SC B0, and SC A1 may be frequency division multiplexed with SC B1. In some aspects, SC B0 and SC B1 may be transmitted by another wireless node 705-B (not shown for simplicity). In this case, wireless node 705-A may determine, based at least in part on the pattern, that SC A0 is to be transmitted in a first time interval of the SC set using a first frequency of the SC set, and that SC A1 is to be transmitted in a second time interval of the SC set using the first frequency of the SC set.

Similarly, another wireless node 705-C (not shown for simplicity) may transmit two synchronization communications in the first SC set, shown as SC C0 and SC C1. As further shown, SC C0 may be frequency division multiplexed with SC D0, and SC C1 may be frequency division multiplexed with SC D1. In some aspects, SC D0 and SC D1 may be transmitted by another wireless node 705-D.

As shown by reference number 720, wireless node 705-D may determine a set of resources, in one or more synchronization communication sets, to be used to transmit multiple synchronization communications based at least in part on a pattern. In this case, wireless node 705-D may determine, based at least in part on the pattern, that SC D0 is to be transmitted in a third time interval of the SC set using a second frequency of the SC set, and that SC D1 is to be transmitted in a fourth time interval of the SC set using the second frequency of the SC set. As shown by reference number 725, wireless node 705-D may transmit the multiple synchronization communications using the set of resources. In some aspects, a first synchronization communication, of the multiple synchronization communications, is frequency division multiplexed with a second synchronization communication. For example, in this case, SC D0 is frequency division multiplexed with SC C0, and SC D1 is frequency division multiplexed with SC C1.

As described elsewhere herein in connection with FIG. 3B, a synchronization communication may include one or more of a PSS, an SSS, a PBCH communication, another physical channel communication (e.g., that includes system information), and/or the like. Additionally, or alternatively, a synchronization communication may be an SS block. Additionally, or alternatively, a synchronization communication set may be an SS burst set.

Furthermore, as described herein in connection with FIG. 3B, an SC may include a base station SC for transmission, which may be referred to as a Tx BS-SS, a Tx gNB-SS, and/or the like. In some aspects, an SC may include a base station SC for reception, which may be referred to as an Rx BS-SS, an Rx gNB-SS, and/or the like. In some aspects, an SC may include a user equipment SC for transmission, which may be referred to as a Tx UE-SS, a Tx NR-SS, and/or the like. In some aspects, a base station SC for transmission and a base station SC for reception are configured for synchronization between base stations. Additionally, or alternatively, a UE SC for transmission may be configured for synchronization between a base station and a user equipment. While some aspects in FIG. 7 are described herein in connection with transmitting an SC (e.g., SC A0, SC A1, SC B0, etc.), in some aspects, one or more of these SCs may be received (e.g., may be a base station SC for reception).

In some aspects, a base station SC may include different information than a user equipment SC. For example, one or more base station SCs may exclude PBCH communications. Additionally, or alternatively, a base station SC and a user equipment SC may differ with respect to one or more of a time resource used for transmission or reception of the SC, a frequency resource used for transmission or reception of the SC, a periodicity of the SC, a waveform of the SC, a beamforming parameter used for transmission or reception of the SC, and/or the like.

In some aspects, the first SC of the multiple SCs transmitted by wireless node 705 may be a first base station SC for transmission. For example, SC A0, which is transmitted by wireless node 705-A, may be a first base station SC for transmission. In some aspects, the second SC that is multiplexed with the first SC may be a second base station SC for transmission, a UE SC for transmission, or a base station SC for reception. For example, SC B0, which is multiplexed with SC A0, may be a second base station SC transmitted by wireless node 705-B, may be a UE SC transmitted by wireless node 705-B, or may be a base station SC received by wireless node 705-B. In this way, a pattern for multiple SCs may be flexibly configured, thereby permitting efficient use of frequency and time resources. In some aspects, a bandwidth available for transmission of the multiple synchronization communications is less than a total system bandwidth, and the pattern may permit efficient use of the available bandwidth.

In some aspects, a wireless node 705 may dynamically decide a manner in which SCs are to be frequency division multiplexed. For example, a wireless node 705 may enter a sleep state to conserve power. Upon exiting the sleep state (e.g., upon waking up), the wireless node 705 may select which SCs are to be transmitted and/or received (e.g., a base station SC for transmission, a base station SC for reception, a UE SC for transmission, and/or the like), and/or may determine a manner in which the selected SCs are to be multiplexed (e.g., based at least in part on recent transmissions, one or more indications received from other wireless nodes 705, network conditions, data for transmission, and/or the like). In this way, the wireless node 705 may conserve battery power and network resources.

In some aspects, a wireless node 705 may determine the set of resources to be used to transmit the multiple SCs based at least in part on a number of hops from the wireless node 705 to an anchor node that is connected to a core network. Additionally, or alternatively, the wireless node 705 may select the one or more resources based at least in part on an index that indicates resources allocated to the wireless node 705 (e.g., as described above in connection with FIG. 6). Additionally, or alternatively, the wireless node 705 may determine the set of resources based at least in part on a random seed. Additionally, or alternatively, the wireless node 705 may determine the set of resources based at least in part on a cell identifier associated with the wireless node

705. Additionally, or alternatively, the wireless node 705 may determine the set of resources based at least in part on a cluster identifier associated with a cluster of wireless nodes 705 that includes the wireless node 705. By using one or more of these techniques to determine the set of resources to be used to transmit the multiple SCs, the wireless node 705 may be more likely to select different resources than another wireless node 705, thereby reducing interference.

Additionally, or alternatively, a wireless node 705 may determine the set of resources based at least in part on one or more signals detected or measured on the set of resources. For example, the wireless node 705 may select a set of resources with a lower signal energy, a lower signal power, and/or the like, as compared to other resources in the SC sets. In this way, the wireless node 705 is more likely to select less crowded resources, thereby reducing interference.

Additionally, or alternatively, a wireless node 705 may determine the set of resources based at least in part on an explicit instruction from another device. For example, the wireless node may determine the set of resources based at least in part on an indication (e.g., scheduling information) from an upper layer (e.g., a device in a core network), which may coordinate resource selection among a cluster of wireless nodes 705. Additionally, or alternatively, the wireless node 705 may determine the set of resources based at least in part on an indication (e.g., scheduling information) received from one or more neighbor wireless nodes 705. For example, one or more neighbor wireless nodes 705 may indicate resources selected by those wireless node(s) 705 for SCs, and the wireless node 705 may select the set of resources based at least in part on the indication(s). Additionally, or alternatively, the wireless node 705 may determine the set of resources based at least in part on whether the wireless node 705 is connected to at least one other wireless node 705 via a wireless backhaul link. In this way, the wireless node 705 may be more likely to select different resources than another wireless node 705 included in the same cluster of wireless nodes 705, thereby reducing interference.

As described in more detail below in connection with FIGS. 8A and 8B, the pattern may be a frequency hopping pattern, a time hopping pattern, and/or the like. Additionally, or alternatively, the pattern may indicate frequency hopping and/or time hopping within an SC set (e.g., intra-set hopping), may indicate frequency hopping and/or time hopping across SC sets (e.g., inter-set hopping), may indicate both intra-set hopping and inter-set hopping, and/or the like. The example pattern shown in FIG. 7 is a baseline pattern that does not include any time hopping or frequency hopping. In this example pattern, the same time and frequency resources are used across SC sets. Other example patterns are described in more detail below in connection with FIGS. 8A and 8B.

As indicated above, FIG. 7 is provided as an example. Other examples are possible and may differ from what was described with regard to FIG. 7.

Figure 8A:
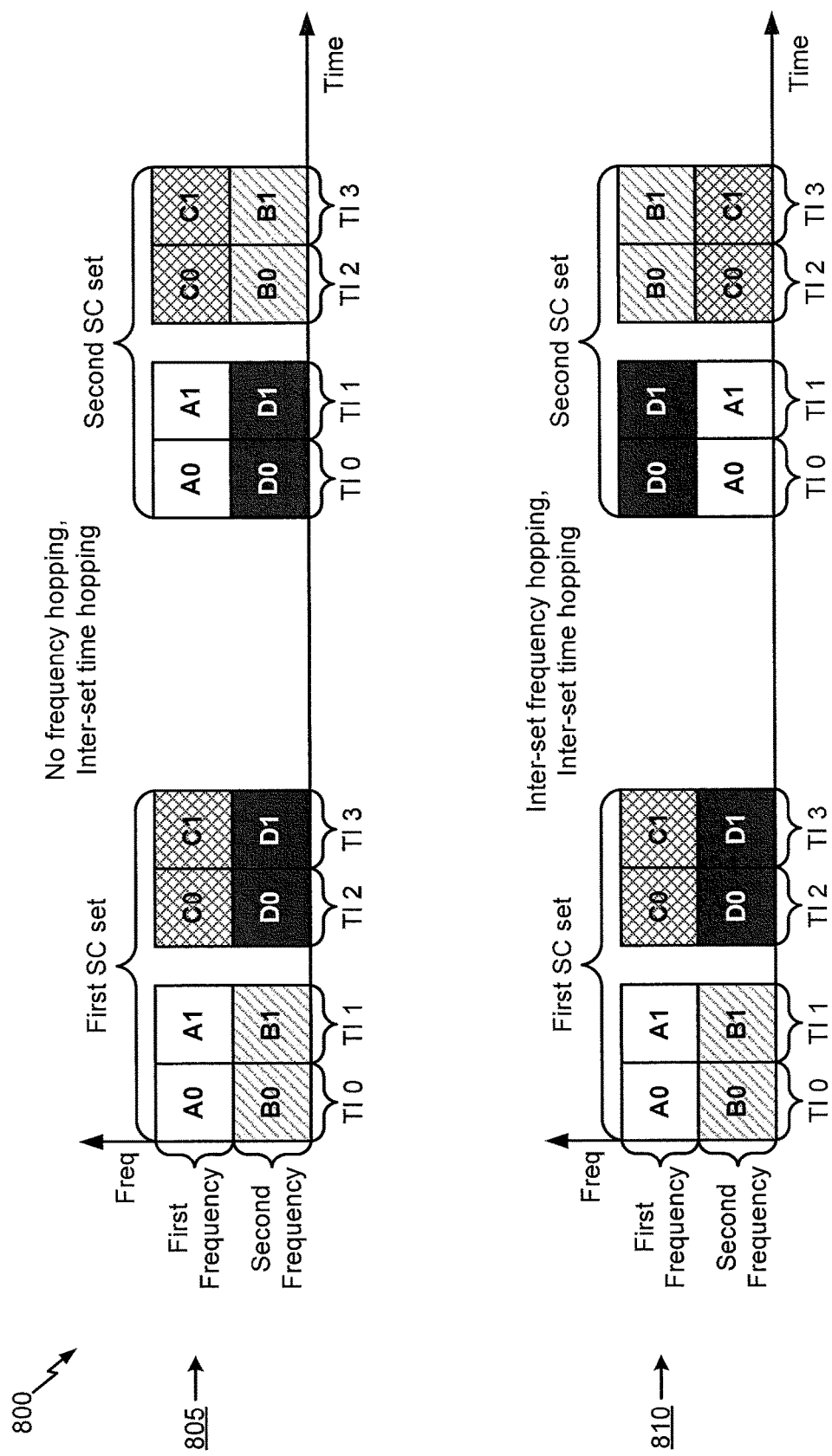
Figure 8B:
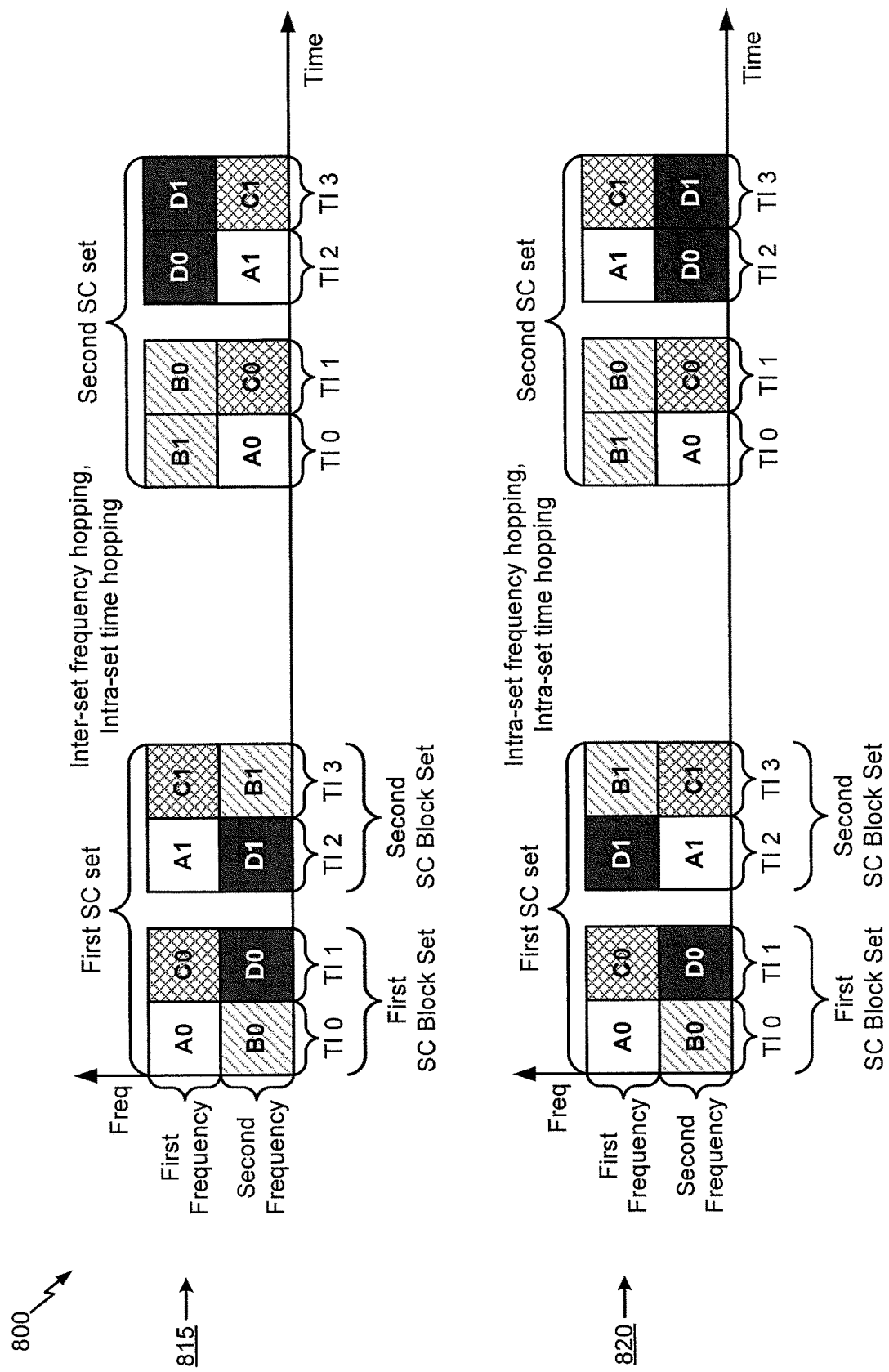

FIGS. 8A and 8B are diagrams illustrating examples 800 of configuring resources for synchronization in a wireless backhaul network, in accordance with various aspects of the present disclosure. FIGS. 8A and 8B show example patterns for determining a set of resources for transmission and/or reception of SCs. These patterns are provided as examples, and other patterns are possible. Additionally, or alternatively, aspects of a first pattern (e.g., for a first SC) may be combined with aspects of a second pattern (e.g., for a second SC). Additionally, or alternatively, different patterns may be used across different SC sets. For example, a first pattern may be used between a first SC set and a second SC set, a second pattern may be used between the second SC set and a third SC set, and/or the like.

As shown in FIG. 8A, a pattern 805 may include inter-set time hopping and may not include frequency hopping. Time hopping may refer to using a different time resource for repetition of an SC in different SC sets. For example, and as shown, in a first SC set, a first time interval (e.g., TI 0) and a second time interval (e.g., TI 1) are used for SC B0 and SC B1, respectively. In a second SC set (e.g., occurring after a synchronization period, as shown in FIG. 7), a third time interval (e.g., TI 2) and a fourth time interval (e.g., TI 3) are used for SC B0 and SC B1, respectively. Similarly, in the first SC set, a third time interval is used for SC D0 and a fourth time interval is used for SC D1, whereas in the second SC set, a first time interval is used for SC D0 and a second time interval is used for SC D1.

In pattern 805, time hopping is used for only some of the SCs. For example, the same time intervals are used for SCs A0, A1, C0, and C1 across SC sets. In some aspects, time hopping may be used for all of the SCs. Furthermore, pattern 805 does not use frequency hopping. Frequency hopping may refer to using a different frequency resource for repetition of an SC in different SC sets. In pattern 805, a first frequency is always used for SCs A0, A1, C0, and C1 (e.g., across SC sets), and a second frequency is always used for SCs B0, B1, D0, and D1 (e.g., across SC sets).

By using a time hopping pattern, detectability of SCs may be increased. For example, in the first SC set of pattern 805, wireless node A transmits SCs A0 and A1 in the same time interval that wireless node B transmits SCs B0 and B 1. Thus, wireless node A will not be able to detect wireless node B during the first SC set, due to half-duplexing. However, wireless node A will be able to detect wireless node B during the second SC set where wireless node A transmits SCs A0 and A1 during different time intervals than wireless node B transmits SCs B0 and B1. In this way, a time hopping pattern for SC transmission may increase detectability of SCs.

As further shown in FIG. 8A, a pattern 810 may include inter-set frequency hopping and inter-set time hopping. As an example of inter-set frequency hopping, in the first SC set, a first frequency is used for SCs A0, A1, C0, and C1, whereas in the second SC set, a second frequency is used for SCs A0, A1, C0, and C1. Similarly, in the first SC set, the second frequency is used for SCs B0, B1, D0, and D1, whereas in the second SC set, the first frequency is used for SCs B0, B1, D0, and D1. While these patterns show the use of two frequencies for transmission of SCs, more than two frequencies may be used, in some aspects. In this case, frequency hopping may occur across a first frequency, a second frequency, a third frequency, etc. Additionally, or alternatively, frequency hopping may be used for some SCs, and not for other SCs.

As further shown, pattern 810 may use time hopping for SCs B0, B1, D0, and D1, in a similar manner as described above in connection with pattern 805. While these patterns show the use of four time intervals for transmission of SCs, a different number of time intervals may be used, in some aspects. In this case, time hopping may occur across two or more of the time intervals. Additionally, or alternatively, time hopping may be used for some SCs, and not for other SCs, as shown by pattern 810, or may be used for all SCs.

By using a frequency hopping pattern, detectability of SCs may be increased for wireless nodes that search only a subset of frequency bands used for SC transmission and/or when a frequency band is associated with poor channel conditions. For example, a wireless node that searches only the first frequency band would be able to detect wireless nodes A, B, C, and D when pattern 810 is used, whereas the same wireless node would only be able to detect wireless nodes A and C when pattern 805 is used. Furthermore, frequency hopping may increase frequency diversity and a likelihood of successful reception of SCs when channel conditions are poor on a frequency band. In this way, a frequency hopping pattern for SC transmission may increase detectability of SCs.

As shown in FIG. 8B, a pattern 815 may include inter-set frequency hopping (e.g., across SC sets) and intra-set time hopping (e.g., within an SC set). As an example of inter-set frequency hopping, in the first SC set, a first frequency is used for SCs A0, A1, C0, and C1, whereas in the second SC set, a second frequency is used for SCs A0, A1, C0, and C1. Similarly, in the first SC set, the second frequency is used for SCs B0, B1, D0, and D1, whereas in the second SC set, the first frequency is used for SCs B0, B1, D0, and D1.

As an example of intra-set time hopping, an SC set (e.g., an SS burst set) may include multiple SC block sets (e.g., SS bursts), as described above in connection with FIG. 3B, and different time intervals may be used, across SC block sets included in the SC set, for SCs associated with the same wireless node (e.g., for SC repetitions). For example, in pattern 815, a first time interval in the first SC block set of the first SC set (e.g., TI 0) is used for B0, and a second time interval in the second SC block set of the first SC set (e.g., TI 3) is used for B1. Similarly, a second time interval in the first SC block set of the first SC set (e.g., TI 1) is used for D0, and a first time interval in the second SC block set of the first SC set (e.g., TI 2) is used for D1. Although two SC block sets are shown per SC set, in some aspects, a different number of SC block sets may be used, and time hopping may be used across the multiple SC block sets.

As further shown in FIG. 8B, a pattern 820 may include intra-set frequency hopping (e.g., within a SC set) and intra-set time hopping (e.g., within an SC set). With intra-set frequency hopping, a different frequency may be used for SCs associated with the same wireless node (e.g., SC repetitions) within an SC set. In some aspects, the different frequency may be used in different SC block sets. As an example of intra-set frequency hopping, in the first SC set, a first frequency is used for SCs A0, B1, C0, and D1, whereas a second frequency is used for SCs A1, B0, C1, and D0. The first frequency is used for SCs A0 and C0 in the first SC block set, and the second frequency is used for SCs A1 and C1 in the second SC block set. Similarly, the second frequency is used for SCs B0 and D0 in the first SC block set, and the first frequency is used for SCs B1 and D1 in the second SC block set.

As further shown, pattern 820 may use intra-set time hopping for SCs B0, B1, D0, and D1 in the first SC set, in a similar manner as described above in connection with pattern 815.

As shown by patterns 805-820, a wireless node may transmit multiple SCs, such as a first SC (e.g., A0) and a third SC (e.g., A1). As further shown by patterns 805-820, the first SC (e.g., A0), may be frequency division multiplexed with a second SC (e.g., B0). In some aspects, and as described above, the pattern may include a frequency hopping pattern (e.g., an inter-set pattern or an intra-set pattern) that indicates a first frequency for the first SC and a second frequency for the third SC. In some aspects, the first frequency is different from the second frequency. In some aspects, the pattern indicates that the first SC and the third SC use different frequency resources in a same SC set, as described above (e.g., an intra-set pattern). In some aspects, the pattern indicates that the first SC and the third SC use different frequency resources in different SC sets (e.g., an inter-set pattern).

In some aspects, and as further described above, the pattern may include a time hopping pattern that indicates a first time interval for the first SC and a second time interval for the third SC (e.g., an inter-set pattern or an intra-set pattern). In some aspects, the first time interval is different from the second time interval. In some aspects, the pattern indicates that the first SC and the third SC use different time resources in a same SC set (e.g., an intra-set pattern). In some aspects, the different time resources are not consecutive. In some aspects, the pattern indicates that the first SC and the third SC use different time resources in different SC sets (e.g., an inter-set pattern).

In some aspects, the third SC is different from the second SC. For example, the third SC may be transmitted by a first wireless node, and the second SC may be transmitted by a second wireless node. In some aspects, the third SC is the second SC. For example, the third SC and the second SC may be the same SC transmitted by a wireless node and frequency division multiplexed with the first SC.

As indicated above, patterns 805-820 are provided as example patterns, and other patterns are possible. The pattern may include any combination of time hopping and/or frequency hopping within and/or across SC sets and/or SC block sets. For example, a pattern may include inter-set time hopping without frequency hopping, may include intra-set time hopping without frequency hopping, may include inter-set frequency hopping without time hopping, may include intra-set frequency hopping without time hopping, may include inter-set time hopping and inter-set frequency hopping, may include inter-set time hopping and intra-set frequency hopping, may include intra-set time hopping and inter-set frequency hopping, may include intra-set time hopping and intra-set frequency hopping, and/or the like. Using one or more of these patterns for SC transmission may increase detectability of SCs.

As indicated above, FIGS. 8A and 8B are provided as examples. Other examples are possible and may differ from what was described with regard to FIGS. 8A and 8B.

Figure 9:
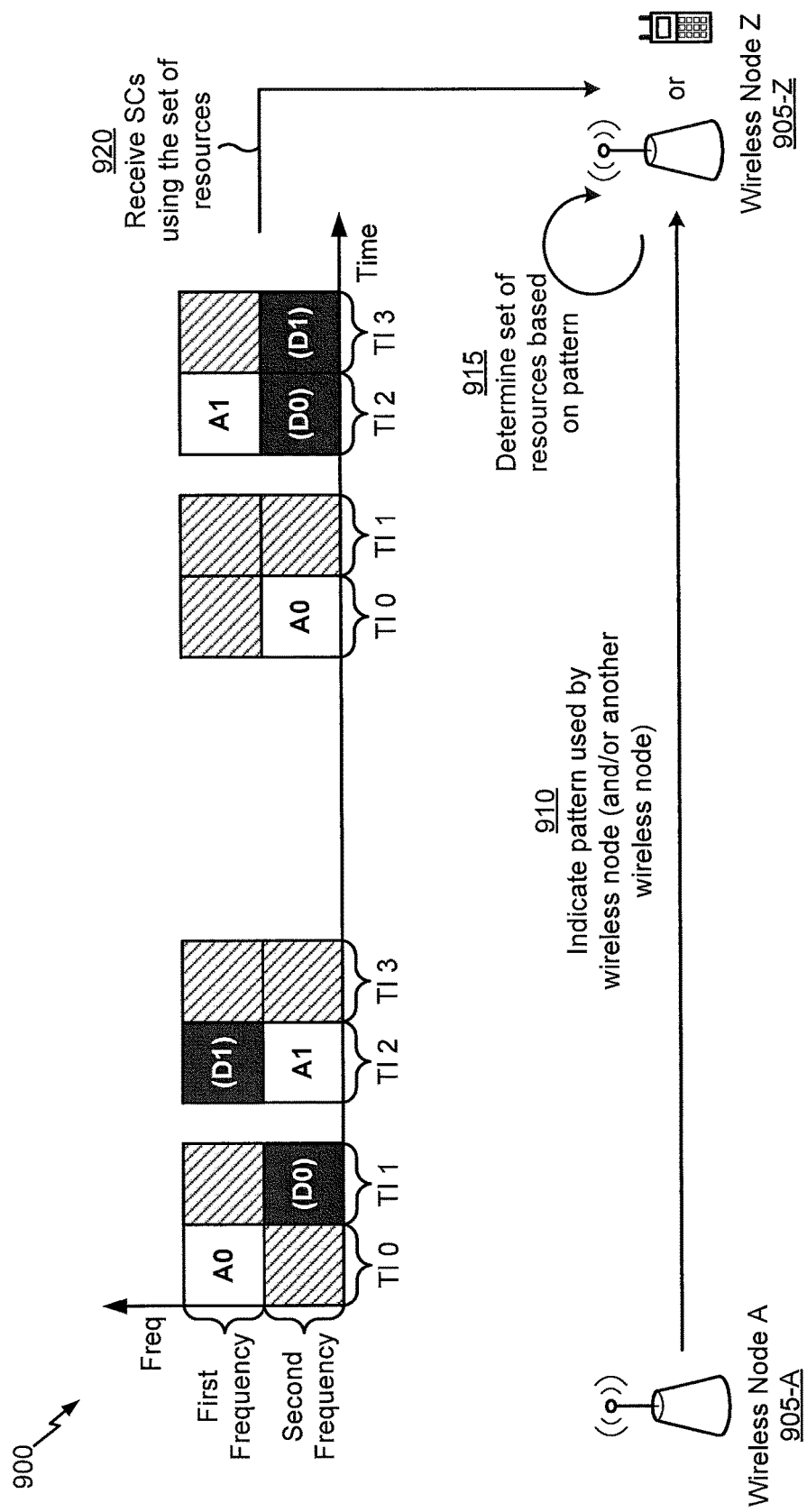

FIG. 9 is a diagram illustrating an example 900 of configuring resources for synchronization in a wireless backhaul network, in accordance with various aspects of the present disclosure.

As shown in FIG. 9, a first wireless node, shown as wireless node 905-A, may communicate with a second wireless node, shown as wireless node 905-Z. In some aspects, one or more wireless nodes 905 may communicate using millimeter waves. In some aspects, one or more wireless nodes 905 may be base stations acting as access points to a core network, such as one or more of the base stations described elsewhere herein in connection with FIGS. 1, 2, 5, and/or 6. Additionally, or alternatively, one or more wireless nodes 905 may be UEs acting as access points to a core network (e.g., via a UE-to-UE network, a device-to-device network, a peer-to-peer network, and/or the like), such as one or more of the UEs described elsewhere herein in connection with FIGS. 1, 2, 5, and/or 6. In some aspects, wireless node 905 may correspond to wireless node 705, as described above in connection with FIG. 7.

As shown by reference number 910, wireless node 905-A may indicate a pattern associated with determining a set of resources, in one or more SC sets, to be used to transmit and/or receive one or more SCs. In some aspects, and as shown, the pattern may be associated with wireless node 905-A. For example, the pattern may indicate SCs to be transmitted by wireless node 905-A, such as SCs A0 and A1. Additionally, or alternatively, the pattern may be associated with one or more other wireless nodes. For example, the pattern may indicate SCs to be transmitted by wireless node 905-D, such as SCs D0 and D1. As shown, wireless node 905-Z may receive the indication of the pattern. Although wireless node 905-Z is shown as receiving the indication of the pattern from another wireless node (e.g., wireless node 905-A), in some aspects, wireless node 905-Z may receive the indication of the pattern via upper layer signaling (e.g., from a core network device).

In some aspects, the pattern may be indicated using a synchronization signal (e.g., a PSS, an SSS, and/or the like), a PBCH, a demodulation reference signal in the PBCH, system information carried in any combination of a master information block (MIB), a system information block (SIB), minimum system information (SI), or other SI, a radio resource control signaling message, a medium access control (MAC) message, and/or the like As shown by reference number 915, wireless node 905-Z may determine the set of resources based at least in part on the indication of the pattern. For example, the pattern may be signaled, as described above, and wireless node 905-Z may use the indicated pattern to determine the set of resources. Additionally, or alternatively, wireless node 905-Z may receive an indication of the pattern by receiving an SC in a frequency or time location, and may determine the set of resources by inferring the set of resources based at least in part on the frequency or time location.

As shown by reference number 920, wireless node 905-Z may receive the one or more SCs using the set of resources. In some aspects, wherein a first SC, of the one or more SCs, is frequency division multiplexed with a second SC, as described elsewhere herein (e.g., in connection with FIGS. 7, 8A, and 8B). In some aspects, the set of resources is included in a single SC set. In some aspects, the set of resources is included in multiple SC sets. By signaling a pattern that indicates locations (e.g., time and/or frequency locations) of resources used for SCs, a receiving wireless node may determine where to search for SCs, thereby conserving processing resources and network resources.

As indicated above, FIG. 9 is provided as an example. Other examples are possible and may differ from what was described with regard to FIG. 9.

Figure 10:
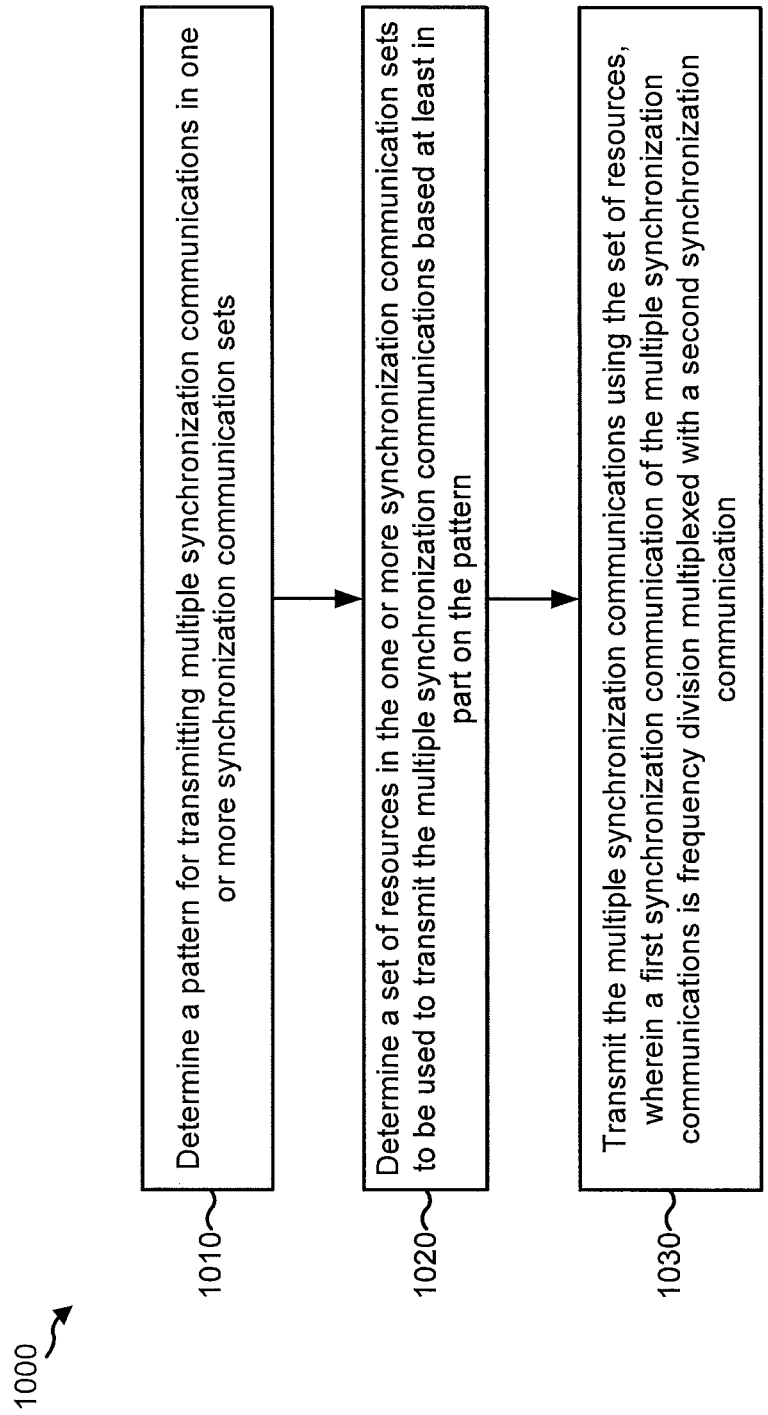
FIGS. 10 and 11 are diagrams illustrating example processes performed, for example, by a wireless node, in accordance with various aspects of the present disclosure.

FIG. 10 is a diagram illustrating an example process 1000 performed, for example, by a wireless node (e.g., a base station, a UE, and/or the like), in accordance with various aspects of the present disclosure.

As shown in FIG. 10, in some aspects, process 1000 may include determining a pattern for transmitting multiple synchronization communications in one or more synchronization communication sets (block 1010). For example, a wireless node may determine a pattern for transmitting multiple synchronization communications in one or more synchronization communication sets, as described in more detail above.

In some aspects, a synchronization communication, of the multiple synchronization communications, includes at least one of: a primary synchronization signal, a secondary synchronization signal, a physical broadcast channel communication, a physical channel carrying remaining minimum system information, a physical channel carrying other system information, or some combination thereof. In some aspects, the synchronization communication is a synchronization signal (SS) block. In some aspects, the synchronization communication set is a synchronization signal (SS) burst set. In some aspects, the wireless node is a base station. In some aspects, the wireless node is a user equipment. In some aspects, the wireless node communicates using millimeter waves.

In some aspects, the wireless node may indicate the pattern associated with the wireless node. In some aspects, the pattern is indicated using one or more of: a synchronization signal, a physical broadcast channel, a demodulation reference signal (DMRS) of a physical broadcast channel, system information carried in any combination of a master information block (MIB), a system information block (SIB), minimum system information (SI), or other SI, a radio resource control signaling message, a medium access control message, or some combination thereof. In some aspects, the wireless node may indicate another pattern used by another wireless node.

As further shown in FIG. 10, in some aspects, process 1000 may include determining a set of resources, in the one or more synchronization communication sets, to be used to transmit the multiple synchronization communications based at least in part on the pattern (block 1020). For example, the wireless node may determine a set of resources, included in the one or more synchronization communication sets, to be used to transmit the multiple synchronization communications based at least in part on the pattern, as described in more detail above.

In some aspects, the set of resources are determined based at least in part on one or more of: a random seed, a cell identifier associated with the wireless node, a number of hops from the wireless node to an anchor node that is connected to a core network, an index that indicates resources allocated to the wireless node, whether the wireless node is connected to at least one other wireless node via a wireless backhaul link, a cluster identifier associated with a cluster of wireless nodes that includes the wireless node, scheduling information received from one or more neighbor wireless nodes, scheduling information received from an upper layer, one or more signals detected or measured on the set of resources, or some combination thereof.

As further shown in FIG. 10, in some aspects, process 1000 may include transmitting the multiple synchronization communications using the set of resources, wherein a first synchronization communication of the multiple synchronization communications is frequency division multiplexed with a second synchronization communication (block 1030). For example, the wireless node may transmit the multiple synchronization communications using the set of resources, as described in more detail above. In some aspects, a first synchronization communication, of the multiple synchronization communications, is frequency division multiplexed with a second synchronization communication.

In some aspects, a bandwidth available for transmission of the multiple synchronization communications is less than a total system bandwidth. In some aspects, the first synchronization communication includes a first base station synchronization communication for transmission. In some aspects, the second synchronization communication includes a second base station synchronization communication for transmission, a user equipment synchronization communication for transmission, or a base station synchronization communication for reception.

In some aspects, the first base station synchronization communication for transmission, the second base station synchronization communication for transmission, and the base station synchronization communication for reception are configured for synchronization between base stations. In some aspects, the user equipment synchronization communication for transmission is configured for synchronization between a base station and a user equipment. In some aspects, the first base station synchronization communication for transmission, the second base station synchronization communication for transmission, or the base station synchronization communication for reception differ from the user equipment synchronization communication for transmission with respect to one or more of: a time resource used for transmission or reception, a frequency resource used for transmission or reception, a periodicity, a waveform, a beamforming parameter, or some combination thereof.

In some aspects, the first synchronization communication is transmitted by the wireless node and the second synchronization communication is transmitted by another wireless node. In some aspects, the multiple synchronization communications include a third synchronization communication transmitted by the wireless node. In some aspects, the pattern includes a frequency hopping pattern that indicates a first frequency for the first synchronization communication and a second frequency for the third synchronization communication. In some aspects, the first frequency is different from the second frequency. In some aspects, the pattern indicates that the first synchronization communication and the third synchronization communication use different frequency resources in a same synchronization communication set. In some aspects, the pattern indicates that the first synchronization communication and the third synchronization communication use different frequency resources in different synchronization communication sets.

In some aspects, the pattern includes a time hopping pattern that indicates a first time interval for the first synchronization communication and a second time interval for the third synchronization communication. In some aspects, the first time interval is different from the second time interval. In some aspects, the pattern indicates that the first synchronization communication and the third synchronization communication use different time resources in a same synchronization communication set. In some aspects, the different time resources are not consecutive. In some aspects, the pattern indicates that the first synchronization communication and the third synchronization communication use different time resources in different synchronization communication sets. In some aspects, the third synchronization communication is different from the second synchronization communication. In some aspects, the third synchronization communication is the second synchronization communication.

In some aspects, at least one of the multiple synchronization communications is beamformed. In some aspects, different synchronization communications of the multiple synchronization communications are transmitted using different transmission beams.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
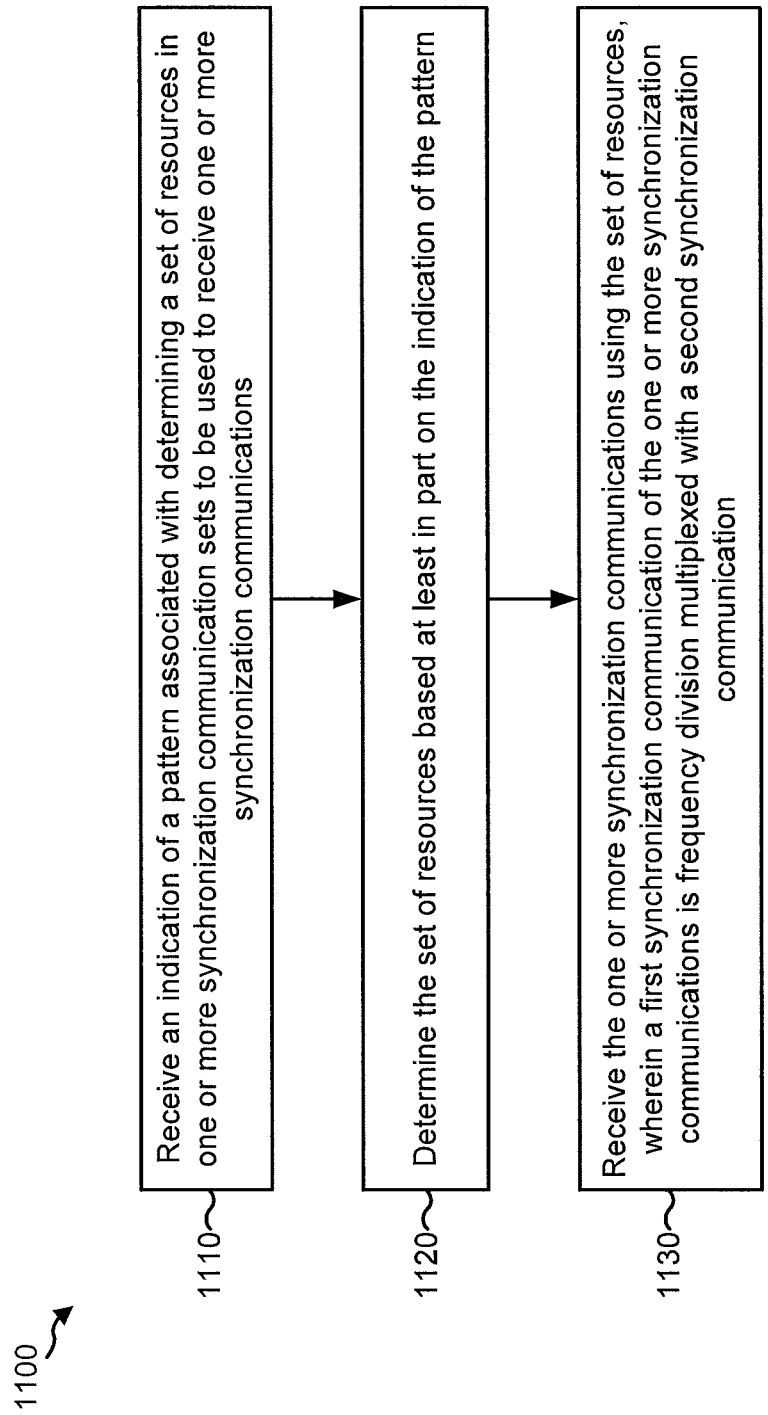

FIG. 11 is a diagram illustrating an example process 1100 performed, for example, by a wireless node (e.g., a base station, a UE, and/or the like), in accordance with various aspects of the present disclosure.

As shown in FIG. 11, in some aspects, process 1100 may include receiving an indication of a pattern associated with determining a set of resources, in one or more synchronization communication sets, to be used to receive one or more synchronization communications (block 1110). For example, a wireless node may receive an indication of a pattern associated with determining a set of resources, in one or more synchronization communication sets, to be used to receive one or more synchronization communications, as described in more detail above.

In some aspects, the wireless node is a base station. In some aspects, the wireless node is a user equipment. In some aspects, the wireless node communicates using millimeter waves.

In some aspects, the indication of the pattern is received from another wireless node. In some aspects, the indication of the pattern is received using at least one of: a primary synchronization signal, a secondary synchronization signal, a demodulation reference signal in a physical broadcast channel, a master information block, a system information block, a minimum system information message, a radio resource control message, a medium access control message, or some combination thereof. In some aspects, the indication of the pattern is received via upper layer signaling In some aspects, receiving the indication of the pattern includes receiving a synchronization communication on a frequency or time location, and determining the set of resources includes inferring the set of resources based at least in part on the frequency or time location.

As further shown in FIG. 11, in some aspects, process 1100 may include determining the set of resources based at least in part on the indication of the pattern (block 1120). For example, the wireless node may determine the set of resources based at least in part on the indication of the pattern, as described in more detail above.

In some aspects, the set of resources is included in a single synchronization communication set. In some aspects, the set of resources is included in multiple synchronization communication set.

As further shown in FIG. 11, in some aspects, process 1100 may include receiving the one or more synchronization communications using the set of resources, wherein a first synchronization communication of the one or more synchronization communications is frequency division multiplexed with a second synchronization communication (block 1130). For example, the wireless node may receive the one or more synchronization communications using the set of resources, as described in more detail above. In some aspects, a first synchronization communication, of the one or more synchronization communications, is frequency division multiplexed with a second synchronization communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication, comprising:
   determining, by a wireless node, a pattern for transmitting multiple synchronization communications in one or more synchronization communication sets;
   determining, by the wireless node, a set of resources, in the one or more synchronization communication sets, to be used to transmit the multiple synchronization communications based at least in part on the pattern; and
   transmitting, by the wireless node, the multiple synchronization communications using the set of resources, wherein a first synchronization communication of the multiple synchronization communications is frequency division multiplexed with a second synchronization communication, wherein the first synchronization communication includes a base station synchronization communication for transmission that is configured for synchronization between base stations, wherein the second synchronization communication includes a user equipment synchronization communication for transmission that is configured for synchronization between a base station and a user equipment, and wherein the base station synchronization communication for transmission differs from the user equipment synchronization communication for transmission with respect to one or more of:
   a time resource used for transmission or reception, or
   a frequency resource used for transmission or reception.

2. The method of claim 1, wherein the base station synchronization communication for transmission differs from the user equipment synchronization communication for transmission further with respect to one or more of:
   a periodicity,
   a waveform,
   a beamforming parameter, or
   some combination thereof.

3. The method of claim 1, wherein the first synchronization communication is transmitted by the wireless node and the second synchronization communication is transmitted by another wireless node.

4. The method of claim 1, wherein the multiple synchronization communications include a third synchronization communication transmitted by the wireless node.

5. The method of claim 4, wherein the pattern includes a frequency hopping pattern that indicates a first frequency for the first synchronization communication and a second frequency for the third synchronization communication.

6. The method of claim 4, wherein the pattern indicates that the first synchronization communication and the third synchronization communication use different frequency resources in a same synchronization communication set.

7. The method of claim 4 wherein the pattern indicates that the first synchronization communication and the third synchronization communication use different frequency resources in different synchronization communication sets.

8. The method of claim 4, wherein the pattern includes a time hopping pattern that indicates a first time interval for the first synchronization communication and a second time interval for the third synchronization communication.

9. The method of claim 4, wherein the pattern indicates that the first synchronization communication and the third synchronization communication use different time resources in a same synchronization communication set.

10. The method of claim 9, wherein the different time resources are not consecutive.

11. The method of claim 4, wherein the pattern indicates that the first synchronization communication and the third synchronization communication use different time resources in different synchronization communication sets.

12. The method of claim 4, wherein the third synchronization communication is the second synchronization communication.

13. The method of claim 1, wherein the set of resources are determined based at least in part on one or more of:
   a random seed,
   a cell identifier associated with the wireless node,
   a number of hops from the wireless node to an anchor node that is connected to a core network,
   an index that indicates resources allocated to the wireless node,
   whether the wireless node is connected to at least one other wireless node via a wireless backhaul link,
   a cluster identifier associated with a cluster of wireless nodes that includes the wireless node,
   scheduling information received from one or more neighbor wireless nodes,
   scheduling information received from an upper layer, one or more signals detected or measured on the set of resources, or some combination thereof.

14. The method of claim 1, wherein different synchronization communications of the multiple synchronization communications are transmitted using different transmission beams.

15. The method of claim 1, wherein a synchronization communication, of the multiple synchronization communications, includes at least one of:
   a primary synchronization signal,
   a secondary synchronization signal,
   a physical broadcast channel communication,
   a physical channel carrying remaining minimum system information,
   a physical channel carrying remaining other system information, or
   some combination thereof.

16. The method of claim 15, wherein the synchronization communication is a synchronization signal (SS) block, and wherein the synchronization communication set is an SS burst set.

17. The method of claim 1, wherein the wireless node is a base station.

18. The method of claim 1, wherein the method further comprises indicating the pattern associated with the wireless node, wherein the pattern is indicated using one or more of:
   a synchronization signal,
   a physical broadcast channel,
   a demodulation reference signal (DMRS) of a physical broadcast channel,
   system information carried in any combination of a master information block (MIB), a system information block (SIB), minimum system information (SI), or other SI,
   a radio resource control signaling message, or
   some combination thereof.

19. The method of claim 1, wherein the method further comprises indicating another pattern used by another wireless node.

20. A method of wireless communication, comprising:
   receiving, by a wireless node, an indication of a pattern associated with determining a set of resources, in one or more synchronization communication sets, to be used to receive one or more synchronization communications;
   determining, by the wireless node, the set of resources based at least in part on the indication of the pattern; and
   receiving, by the wireless node, the one or more synchronization communications using the set of resources, wherein a first synchronization communication of the one or more synchronization communications is frequency division multiplexed with a second synchronization communication, wherein the first synchronization communication includes a base station synchronization communication for transmission that is configured for synchronization between base stations, wherein the second synchronization communication includes a user equipment synchronization communication for transmission that is configured for synchronization between a base station and a user equipment, and wherein the base station synchronization communication for transmission differs from the user equipment synchronization communication for transmission with respect to one or more of:
   a time resource used for transmission or reception, or
   a frequency resource used for transmission or reception.

21. The method of claim 20, wherein the wireless node is a base station.

22. The method of claim 20, wherein the wireless node is a user equipment.

23. The method of claim 20, wherein the set of resources is included in:
   a single synchronization communication set, or
   multiple synchronization communication sets.

24. The method of claim 20, wherein the indication of the pattern is received from another wireless node using at least one of:
   a primary synchronization signal,
   a secondary synchronization signal,
   a demodulation reference signal in a physical broadcast channel,
   a master information block,
   a system information block,
   a minimum system information message,
   a radio resource control message,
   a medium access control message,
   upper layer signaling, or
   some combination thereof.

25. The method of claim 20, wherein receiving the indication of the pattern comprises receiving a synchronization communication on a frequency or time location; and
   wherein determining the set of resources comprises inferring the set of resources based at least in part on the frequency or time location.

26. A wireless node for wireless communication, comprising:
   memory; and
   one or more processors operatively coupled to the memory, the memory and the one or more processors configured to:
   determine a pattern for transmitting multiple synchronization communications in one or more synchronization communication sets;
   determine a set of resources, in the one or more synchronization communication sets, to be used to transmit the multiple synchronization communications based at least in part on the pattern; and
   transmit the multiple synchronization communications using the set of resources, wherein a first synchronization communication of the multiple synchronization communications is frequency division multiplexed with a second synchronization communication, wherein the first synchronization communication includes a base station synchronization communication for transmission that is configured for synchronization between base stations, wherein the second synchronization communication includes a user equipment synchronization communication for transmission that is configured for synchronization between a base station and a user equipment, and wherein the base station synchronization communication for transmission differs from the user equipment synchronization communication for transmission with respect to one or more of:
   a time resource used for transmission or reception, or
   a frequency resource used for transmission or reception.

27. A wireless node for wireless communication, comprising:
   memory; and
   one or more processors operatively coupled to the memory, the memory and the one or more processors configured to:

receive an indication of a pattern associated with determining a set of resources, in one or more synchronization communication sets, to be used to receive one or more synchronization communications;

determine the set of resources based at least in part on the indication of the pattern; and receive the one or more synchronization communications using the set of resources, wherein a first synchronization communication of the one or more synchronization communications is frequency division multiplexed with a second synchronization communication, wherein the first synchronization communication includes a base station synchronization communication for transmission that is configured for synchronization between base stations, wherein the second synchronization communication includes a user equipment synchronization communication for transmission that is configured for synchronization between a base station and a user equipment, and wherein the base station synchronization communication for transmission differs from the user equipment synchronization communication for transmission with respect to one or more of:

a time resource used for transmission or reception, or
a frequency resource used for transmission or reception.

28. The wireless node of claim 26, wherein the base station synchronization communication for transmission differs from the user equipment synchronization communication for transmission further with respect to one or more of:
   a periodicity,
   a waveform,
   a beamforming parameter, or
   some combination thereof.

29. The wireless node of claim 26, wherein the wireless node is a base station.

30. The wireless node of claim 27, wherein the base station synchronization communication for transmission differs from the user equipment synchronization communication for transmission further with respect to one or more of:
   a periodicity,
   a waveform,
   a beamforming parameter, or
   some combination thereof.

* * * * *